United States Patent
Kitajima

(10) Patent No.: US 11,562,295 B2
(45) Date of Patent: Jan. 24, 2023

(54) NODE INFORMATION ESTIMATION METHOD AND INFORMATION PROCESSING APPARATUS

(71) Applicant: FUJITSU LIMITED, Kawasaki (JP)

(72) Inventor: Hironobu Kitajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 388 days.

(21) Appl. No.: 16/795,645

(22) Filed: Feb. 20, 2020

(65) Prior Publication Data
US 2020/0279190 A1 Sep. 3, 2020

(30) Foreign Application Priority Data
Feb. 28, 2019 (JP) .............................. JP2019-035642

(51) Int. Cl.
*G06F 7/00* (2006.01)
*G06N 20/00* (2019.01)
(Continued)

(52) U.S. Cl.
CPC ........... *G06N 20/00* (2019.01); *G06F 16/285* (2019.01); *G06F 16/288* (2019.01); *G06F 16/9024* (2019.01)

(58) Field of Classification Search
CPC ..... G06N 20/00; G06F 16/285; G06F 16/288; G06F 16/9024
(Continued)

(56) References Cited

U.S. PATENT DOCUMENTS

| 7,769,032 B1* | 8/2010 | Ou | H04L 45/123 709/223 |
| 2012/0005238 A1* | 1/2012 | Jebara | G06Q 30/08 707/E17.011 |

(Continued)

FOREIGN PATENT DOCUMENTS

| JP | 2014-059754 A | 4/2014 |
| JP | 2015-115066 A | 6/2015 |

(Continued)

OTHER PUBLICATIONS

Xiaojin Zhu et al., "Semi-Supervised Learning Using Gaussian Fields and Harmonic Functions", Proceedings of the Twentieth International Conference on Machine Learning (ICML-2003), Washington DC, Aug. 21-24, 2003 (Total 9 pages).

(Continued)

*Primary Examiner* — Md I Uddin
(74) *Attorney, Agent, or Firm* — Fujitsu Patent Center

(57) ABSTRACT

A memory stores graph information representing a graph that includes nodes and inter-node edges. The nodes include a first plurality of nodes each associated with node information and a first node. Each of the inter-node edges has a weight. A processor extracts, in accordance with the node information, two or more nodes and transforms the two or more nodes into an aggregate node. The processor generates an aggregate inter-node edge between the aggregate node and the first node. The aggregate inter-node edge is associated with a weight based on two or more weights associated with two or more inter-node edges between the two or more nodes and the first node. The processor estimates first node information to be associated with the first node based on transformed graph information representing a transformed graph including the aggregate node and the aggregate inter-node edge.

7 Claims, 19 Drawing Sheets

(51) Int. Cl.
　　　*G06F 16/901*　　　(2019.01)
　　　*G06F 16/28*　　　(2019.01)
(58) Field of Classification Search
　　　USPC .......................................... 707/722, 737, 748
　　　See application file for complete search history.

(56) References Cited

U.S. PATENT DOCUMENTS

| | | |
|---|---|---|
| 2014/0201208 A1 | 7/2014 | Satish et al. |
| 2014/0280143 A1* | 9/2014 | Milenova ................ G06F 16/35 707/737 |
| 2015/0161228 A1 | 6/2015 | Davies |
| 2016/0283462 A1 | 9/2016 | Gallé et al. |

FOREIGN PATENT DOCUMENTS

| | | |
|---|---|---|
| JP | 2016-181252 A | 10/2016 |
| WO | 2014/113281 A1 | 7/2014 |

OTHER PUBLICATIONS

Leonid E. Zhukov, "Label Propagation on Graphs", Structural Analysis and Visualization of Networks, May 19, 2015 URL:http://www.leonidzhukov.net/hse/2015/networks/lectures/lecture17.pdf (Total 26 pages).

* cited by examiner

GRAPH INFORMATION
151

| SCORE | -1 | -1 | -1 | 7 | 10 | 10 | 7 | 10 | 7 |
|---|---|---|---|---|---|---|---|---|---|
| NODE ID | #1 | #2 | #3 | #4 | #5 | #6 | #7 | #8 | #9 |
| #1 | 0 | w12 | 0 | w14 | w15 | 0 | w17 | 0 | 0 |
| #2 |  | 0 | 0 | 0 | w25 | 0 | 0 | w28 | 0 |
| #3 |  |  | 0 | 0 | 0 | 0 | 0 | w38 | w39 |
| #4 |  |  |  | 0 | 0 | w46 | 0 | 0 | 0 |
| #5 |  |  |  |  | 0 | 0 | 0 | 0 | 0 |
| #6 |  |  |  |  |  | 0 | 0 | 0 | 0 |
| #7 |  |  |  |  |  |  | 0 | w78 | 0 |
| #8 |  |  |  |  |  |  |  | 0 | 0 |
| #9 |  |  |  |  |  |  |  |  | 0 |

FIG. 7

GRAPH INFORMATION 250

| SCORE | −1 | −1 | −1 | 9 | 10 | 7.5 | 8 | 7 | 5 |
|---|---|---|---|---|---|---|---|---|---|
| NODE ID | #1 | #2 | #3 | #4 | #5 | #6 | #7 | #8 | #9 |
| #1 | 0 | w12 | 0 | w14 | w15 | 0 | w17 | 0 | 0 |
| #2 | | 0 | 0 | 0 | w25 | 0 | 0 | w28 | 0 |
| #3 | | | 0 | 0 | 0 | 0 | 0 | w38 | w39 |
| #4 | | | | 0 | 0 | w46 | 0 | 0 | 0 |
| #5 | | | | | 0 | 0 | 0 | 0 | 0 |
| #6 | | | | | | 0 | 0 | 0 | 0 |
| #7 | | | | | | | 0 | w78 | 0 |
| #8 | | | | | | | | 0 | 0 |
| #9 | | | | | | | | | 0 |

FIG. 14

PARTITIONED GRAPH INFORMATION ─ 252

| SCORE | -1 | -1 | 9 | 10 | 8 | 7 |
|---|---|---|---|---|---|---|
| NODE ID | #1 | #2 | #4 | #5 | #7 | #8 |
| #1 | 0 | w12 | w14 | w15 | w17 | 0 |
| #2 |  | 0 | 0 | w25 | 0 | w28 |
| #4 |  |  | 0 | 0 | 0 | 0 |
| #5 |  |  |  | 0 | 0 | 0 |
| #7 |  |  |  |  | 0 | w78 |
| #8 |  |  |  |  |  | 0 |

PARTITIONED GRAPH INFORMATION ─ 253

| SCORE | 9 | 7.5 |
|---|---|---|
| NODE ID | #4 | #6 |
| #4 | 0 | w46 |
| #6 |  | 0 |

PARTITIONED GRAPH INFORMATION ─ 251

| SCORE | -1 | 7 | 5 |
|---|---|---|---|
| NODE ID | #3 | #8 | #9 |
| #3 | 0 | w38 | w39 |
| #8 |  | 0 | 0 |
| #9 |  |  | 0 |

FIG. 15

NODE INFORMATION ESTIMATION METHOD AND INFORMATION PROCESSING APPARATUS

CROSS-REFERENCE TO RELATED APPLICATION

This application is based upon and claims the benefit of priority of the prior Japanese Patent Application No. 2019-035642, filed on Feb. 28, 2019, the entire contents of which are incorporated herein by reference.

FIELD

The embodiments discussed herein are related to a node information estimation technique.

BACKGROUND

Massive graphs including a large number of nodes and edges connecting them are sometimes generated to enable various analysis tasks. Some graph analysis tasks are designed to estimate unknown node information based on a graph in which some nodes are given node information, such as classification labels, while others are not. In such graph analysis tasks, node information of the other nodes is calculated by stochastically propagating the node information given to the former nodes between nodes according to weights assigned to edges. In some cases, for example, entities such as companies are represented by nodes and the strengths of relationships between the entities are represented by weighted edges to estimate, from known information on some entities, unknown information on other entities.

There are known technologies of applying semi-supervised machine learning over a graph where nodes with node information and those without node information are mixedly present, while deeming the node information of the former nodes as training information. There is also a proposed technology of classifying labeled sample data sets and unlabeled sample data sets into a plurality of clusters. There is another proposed technology of propagating identification information of some nodes to others based on inter-node edges and clustering a plurality of nodes based on the propagated identification information. There is yet another proposed technology of estimating, based on the relationship between posts with language labels and each post without a language label, a language of the latter unlabeled post.

Related arts are disclosed in Japanese Laid-open Patent Publication No. 2014-59754, International Publication Pamphlet No. WO 2014113281, Japanese Laid-open Patent Publication No. 2015-115066, Japanese Laid-open Patent Publication No. 2016-181252, and Xiaojin Zhu, Zoubin Ghahramani and John Lafferty, "Semi-Supervised Learning Using Gaussian Fields and Harmonic Functions", Proceedings of the 20th International Conference on Machine Learning, pp. 912-919, 2003-08-21, for example.

In a graph analysis task of estimating unknown node information, known node information is propagated through edges, which allows calculation per connected subgraph (connected component) in which all pairs of a plurality of nodes are connected by edges. However, there remains a problem that a task of analyzing a graph involves high computational effort and therefore takes a long time if huge connected subgraphs with a large number of nodes exist in the graph.

SUMMARY

According to one aspect, there is provided a computer-implemented node information estimation method including: acquiring graph information representing a graph that includes a plurality of nodes and a plurality of inter-node edges between the plurality of nodes, the plurality of nodes including a first plurality of nodes each associated with node information and a first node different from the first plurality of nodes, each of the plurality of inter-node edges being associated with a weight; extracting, in accordance with the node information, two or more nodes from the first plurality of nodes and transforming the two or more nodes into an aggregate node; generating an aggregate inter-node edge between the aggregate node and the first node, the aggregate inter-node edge being associated with a weight based on two or more weights associated with two or more inter-node edges between the two or more nodes and the first node; and estimating first node information to be associated with the first node based on transformed graph information representing a transformed graph including the aggregate node and the aggregate inter-node edge.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates exemplary graph information according to the third embodiment;

FIG. 14 illustrates exemplary graph information according to the fourth embodiment;

FIG. 15 illustrates exemplary partitioned graph information according to the fourth embodiment;

DESCRIPTION OF EMBODIMENTS

There is a graph simplification technique to reduce a complex graph to a simple one, called k-Nearest Neighbor, which prunes weak edges with small weights of the complex graph to construct a k-nearest neighbor graph. However, such a common graph simplification technique does not guarantee dividing huge connected subgraphs into small disconnected subgraphs and therefore does not always provide sufficient savings in computational effort.

Several embodiments will be described below with reference to the accompanying drawings.

Figure 1:
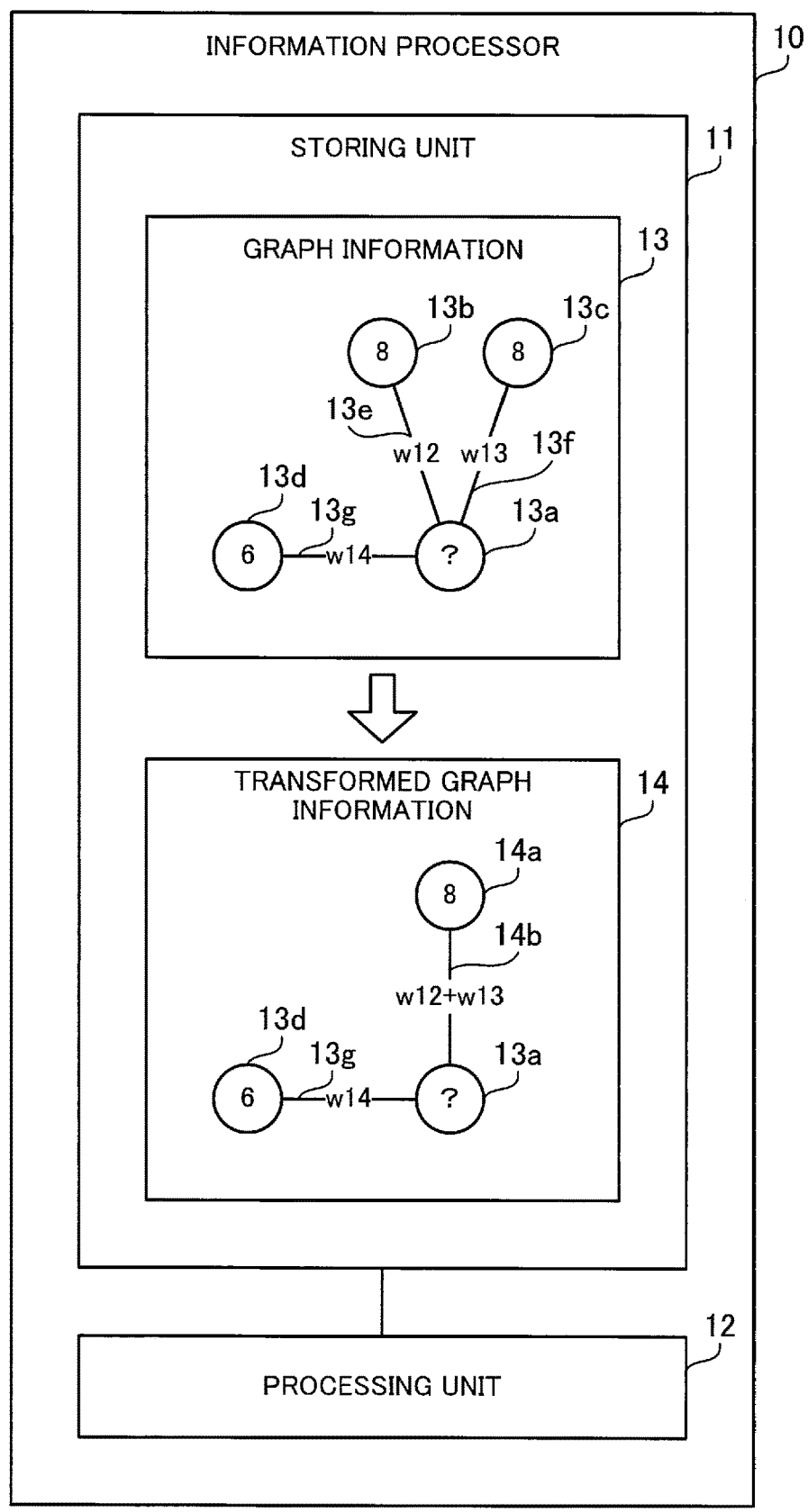
FIG. 1 illustrates an exemplary information processor according to a first embodiment.

A first embodiment is described hereinafter. FIG. 1 illustrates an exemplary information processor according to the first embodiment.

An information processor 10 of the first embodiment analyzes a graph including a plurality of nodes and inter-node edges. The information processor 10 may be referred to as a computer. In addition, the information processor 10 may be a client device or server device. Graphs analyzed by the information processor 10 are massive graphs with nodes representing entities, such as companies, people, or apparatuses and edges representing relationships between the entities. One example of such graphs is a corporate network representing business relationships between companies.

The information processor 10 includes a storing unit 11 and a processing unit 12. The storing unit 11 may be volatile semiconductor memory such as random access memory (RAM), or a non-volatile storage device such as a hard disk drive (HDD) or flash memory. The processing unit 12 is, for example, a processor such as a central processing unit (CPU), graphics processing unit (GPU), or digital signal processor (DSP). Note however that, the processing unit 12 may include an electronic circuit designed for specific use, such as an application specific integrated circuit (ASIC) or field programmable gate array (FPGA). The processor executes programs stored in memory such as RAM (or in the storing unit 11). The term "multiprocessor", or simply "processor", may be used to refer to a set of multiple processors.

The storing unit 11 stores graph information 13. A graph defined by the graph information 13 includes a plurality of nodes and a plurality of edges between the nodes. The nodes include a plurality of first nodes each associated with a node information piece and a second node different from the first nodes. No node information piece may be associated with the second node. Each node information piece is, for example, a numerical value indicating an evaluation of an entity represented by the corresponding node. Numerical values usable as node information pieces are preferably a set of a relatively small number of discrete numerical values. A weight is assigned to each of the edges. Each weight is a numerical value whose magnitude indicates the strength of the relationship between two nodes connected by the corresponding edge. For example, a larger weight indicates a stronger relationship between them.

As an example, the graph defined by the graph information 13 includes nodes 13a, 13b, 13c, and 13d and edges 13e, 13f, and 13g. The node 13a is the second node with which a node information piece is not associated. The nodes 13b, 13c, and 13d are the first nodes with which node information pieces are individually associated. The node information piece of the node 13b is "8". The node information piece of the node 13c is "8". The node information piece of the node 13d is "6". The edge 13e connects the nodes 13a and 13b and has a weight w12. The edge 13f connects the nodes 13a and 13c and has a weight w13. The edge 13g connects the nodes 13a and 13d and has a weight w4.

The processing unit 12 generates, from the graph information 13, transformed graph information 14 representing a simplified transformed graph. The transformed graph information 14 is stored, for example, in the storing unit 11.

Specifically, the processing unit 12 extracts, based on the node information pieces individually associated with the first nodes, a node group including two or more first nodes amongst the first nodes. The first nodes belonging to the node group are, for example, a part of the first nodes included in the graph. The processing unit 12 may extract two or more first nodes associated with the same node information piece. Alternatively, the processing unit 12 may extract two or more first nodes associated with similar node information pieces. Even when the node information pieces are different, if the degree of similarity calculated for the different node information pieces exceeds a threshold, the node information pieces are determined to be similar to each other.

The processing unit 12 transforms the node group into a single aggregate node. The processing unit 12 may associate, with the aggregate node, a node information piece determined based on the node information pieces associated with the first nodes before the transformation. For example, when the node group is a set of first nodes associated with the same node information piece, the processing unit 12 may associate the same node information piece with the aggregate node. On the other hand, if the node group is a set of first nodes individually associated with similar node information pieces, the processing unit 12 may associate the average of the similar node information pieces with the aggregate node.

As an example, the same node information piece "8" is associated with the nodes 13b and 13c. Then, the processing unit 12 extracts the nodes 13b and 13c and transforms the nodes 13b and 13c into a single aggregate node 14a. The processing unit 12 subsequently associates, with the aggregate node 14a, the same node information piece "8" as that of the nodes 13b and 13c before the transformation.

Note here that, when the node group is transformed into the single aggregate node, each inter-node edge is still maintained. If the second node is connected by edges to different first nodes belonging to the node group, the transformation into the aggregate node creates two or more edges (multiple edges) between the aggregate node and the second node. Therefore, the processing unit 12 transforms the two or more edges between the aggregate node and the second node into a single aggregate edge. The aggregate edge is assigned an aggregate weight according to the weights of the two or more edges. For example, the aggregate weight is the sum of the weights of the two or more edges.

As an example, when the nodes 13b and 13c are transformed into the aggregate node 14a, multiple edges, the edges 13e and 13f, exist between the node 13a and the aggregate node 14a. Therefore, the processing unit 12 transforms the edges 13e and 13f into a single aggregate edge 14b. At this time, the processing unit 12 sets the weight of the aggregate edge 14b to a weight w12+w13, which is the summation of the weight w12 of the edge 13e and the weight w13 of the edge 13f.

Subsequently, the processing unit 12 generates the transformed graph information 14 representing a transformed graph including the aggregate node and edge, and estimates a node information piece to be associated with the second node based on the transformed graph information 14. For example, the processing unit 12 uses the node information piece associated with the aggregate node and the weight of the aggregate edge to thereby calculate the node information piece of the second node.

As an example, the transformed graph defined by the transformed graph information 14 includes the nodes 13a and 13d, the aggregate node 14a, the edge 13g, and the aggregate edge 14b. The node information piece of the node 13a is unknown. The node information piece of the node 13d is "6". The node information piece of the aggregate node 14a is "8". The edge 13g connects the nodes 13a and 13d and has the weight w14. The edge 14b connects the node 13a and the aggregate node 14a and has the weight w12+w13. The processing unit 12 estimates the node information piece of the node 13a by propagating the known node information pieces. For example, the processing unit 12 performs the estimation process in consideration of propagation of the node information piece "6" of the node 13d through the edge 13g having the weight w14 and propagation of the node information piece "8" of the aggregate node 14a through the aggregate edge 14b having the weight w12+w13.

According to the information processor 10 of the first embodiment, a node group is extracted based on known node information pieces from a graph defined by the graph information 13, and the node group is then transformed into an aggregate node. If the transformation creates multiple edges between the aggregate node and a different node, the multiple edges are transformed into an aggregate edge having an aggregate weight which is assigned according to weights of the multiple edges. Then, an unknown node information piece is estimated based on the transformed graph information 14 representing a transformed graph.

Herewith, it is possible to reduce the number of nodes in a graph used for node information estimation, which in turn provides savings in computational effort. This therefore results in increased speed of the node information estimation. The reduction in the number of nodes is achieved by aggregating nodes grouped according to their known node information pieces into a single node, and multiple edges created as a result of the reduction of the number of nodes are aggregated into a single edge having an aggregate weight assigned according to original weights of the multiple edges. In this manner, effects of the graph transformation on the estimation results are mitigated, thereby preventing loss of estimation accuracy.

Figure 2:
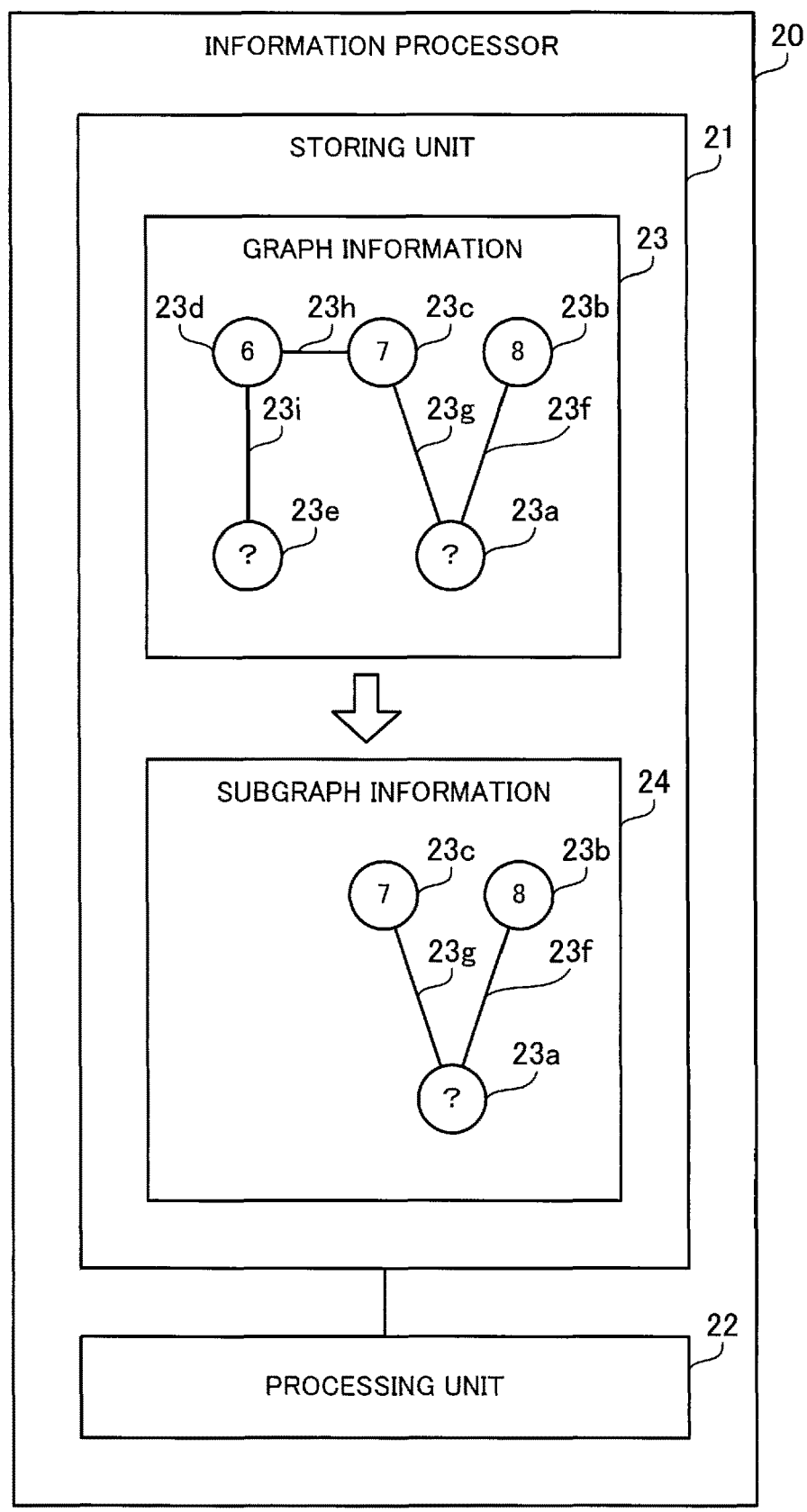
FIG. 2 illustrates an exemplary information processor according to a second embodiment.

FIG. 2 illustrates an exemplary information processor according to a second embodiment. An information processor 20 of the second embodiment analyzes a graph including a plurality of nodes and inter-node edges, as in the first embodiment. The information processor 20 may be referred to as a computer. In addition, the information processor 20 may be a client device or server device.

The information processor 20 includes a storing unit 21 and a processing unit 22. The storing unit 21 may be volatile semiconductor memory such as RAM, or a non-volatile storage device such as an HDD or flash memory. The processing unit 22 is, for example, a processor such as a CPU, GPU, or DSP. Note however that, the processing unit 22 may include an electronic circuit designed for specific use, such as an ASIC or FPGA. The processor executes programs stored in memory, such as RAM.

The storing unit 21 stores graph information 23. A graph defined by the graph information 23 includes a plurality of nodes and a plurality of edges between the nodes. The nodes include a plurality of first nodes each associated with a node information piece and a second node different from the first nodes. No node information piece may be associated with the second node.

As an example, the graph defined by the graph information 23 includes nodes 23a, 23b, 23c, 23d, and 23e and edges 23f, 23g, 23h, and 23i. The node 23a is the second node with which a node information piece is not associated. The nodes 23b, 23c, and 23d are the first nodes with which node information pieces are individually associated. The node 23e is a node with which a node information piece is not associated. The node information piece of the node 23b is "8". The node information piece of the node 23c is "7". The node information piece of the node 23d is "6". The edge 23f connects the nodes 23a and 23b. The edge 23g connects the nodes 23a and 23c. The edge 23h connects the nodes 23c and 23d. The edge 23i connects the nodes 23d and 23e.

The processing unit 22 generates, from the graph information 23, subgraph information 24 representing a subgraph. The subgraph information 24 is stored, for example, in the storing unit 21.

Specifically, the processing unit 22 determines, amongst the plurality of first nodes, those reachable from the second node based on the graph information 23. The reachable first nodes here means first nodes reachable, via one or more edges amongst the plurality of edges, without running through another first node. If there is no path to reach from the second node to a first node without passing through a different first node, the first node is regarded as unreachable from the second node. Two or more reachable first nodes may be detected. The processing unit 22 extracts, from the graph defined by the graph information 23, a subgraph including the second node and having a boundary around the first nodes reachable from the second node.

The processing unit 22 generates the subgraph information 24 representing the extracted subgraph. The subgraph defined by the subgraph information 24 includes subsets of nodes and edges among all the nodes and edges included in the graph defined by the graph information 23. The "reachable first nodes" are used as partitioning vertices to separate the subgraph to be extracted and the remaining part of the graph.

As an example, from the node 23a, the node 23b is reachable via the edge 23f and the node 23c is reachable via the edge 23g. On the other hand, because there is no path between the nodes 23a and 23d to bypass the node 23c, the node 23d is unreachable from the node 23a. Further, because there is no path between the nodes 23a and 23e to bypass the nodes 23c and 23d, the node 23e is unreachable from the node 23a. Therefore, the processing unit 22 extracts, from the graph, a subgraph with a boundary drawn around the nodes 23b and 23c reachable from the node 23a. Herewith, the subgraph including the nodes 23a, 23b, and 23c and the edges 23f and 23g is extracted.

Then, based on the subgraph information 24, the processing unit 22 estimates a node information piece to be associated with the second node from the node information pieces of the reachable first nodes. At this time, the processing unit 22 need not take into consideration nodes and edges beyond the subgraph defined by the subgraph information 24.

As an example, the processing unit 22 estimates the node information piece of the node 23a by propagating known node information pieces within the subgraph. For example, the processing unit 22 performs the estimation process in consideration of propagation of the node information piece "8" of the node 23b through the edge 23f having a weight and propagation of the node information piece "7" of the node 23c through the edge 23g having a weight. At this time, the processing unit 22 need not take into consideration the nodes 23d and 23e and the edges 23h and 23i. The estimation of the node information piece of the node 23a is performed independently of the estimation of the node information piece of the node 23e.

According to the information processor 20 of the second embodiment, amongst nodes having known node information pieces, nodes reachable, without going through one or more different nodes having known node information pieces, from a node whose node information piece is unknown are determined based on the graph information 23. A subgraph with a boundary drawn around the determined reachable nodes is extracted from the original graph. Then, the unknown node information piece is estimated based on the subgraph information 24 representing the extracted subgraph.

Herewith, it is possible to reduce the size of a graph used for node information estimation, which in turn provides savings in computational effort. This therefore results in increased speed of the node information estimation. In addition, the node information propagation between nodes need not take into consideration propagation of a node information piece of a node beyond other nodes having known node information pieces. Therefore, effects of the graph partitioning with a boundary around "reachable nodes" on the estimation results are mitigated, thereby preventing loss of estimation accuracy.

Figure 3:
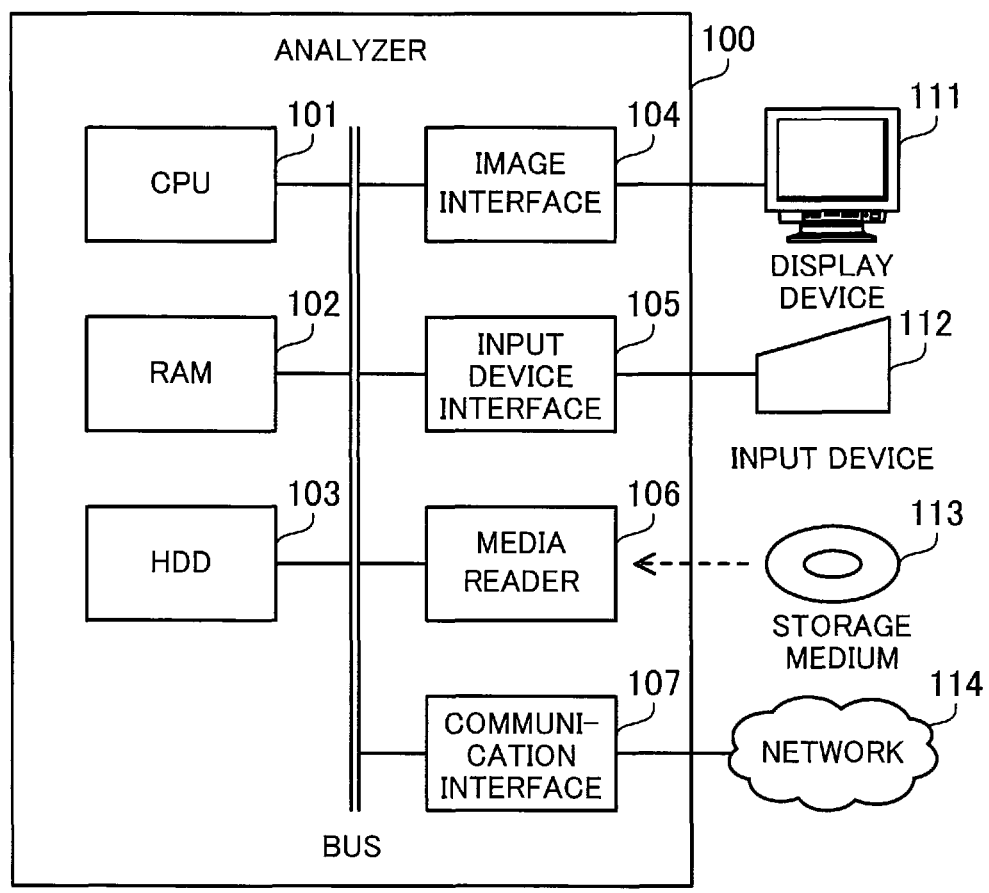
FIG. 3 is a block diagram illustrating an exemplary hardware configuration of an analyzer according to a third embodiment.

A third embodiment is described next. FIG. 3 is a block diagram illustrating an exemplary hardware configuration of an analyzer according to the third embodiment.

An analyzer 100 of the third embodiment analyzes a corporate network which is a graph representing business relationships among companies. The analyzer 100 estimates, using the corporate network and investment rating information of some companies, investment ratings of different companies. The analyzer 100 may be referred to as an information processor or computer. In addition, the analyzer 100 may be a client device or server device. The analyzer 100 corresponds to the information processor 10 of the first embodiment.

The analyzer 100 includes a CPU 101, a RAM 102, an HDD 103, an image interface 104, an input device interface 105, a media reader 106, and a communication interface 107. These units are individually connected to a bus. The CPU 101 corresponds to the processing unit 12 of the first embodiment. The RAM 102 or the HDD 103 corresponds to the storing unit 11 of the first embodiment.

The CPU 101 is a processor including a computing circuit for carrying out program instructions. The CPU 101 reads out at least part of programs and data stored in the HDD 103, loads them into the RAM 102, and executes the loaded programs. Note that the CPU 101 may include two or more processor cores and the analyzer 100 may include two or more processors, and processes to be described later may be executed in parallel using these processors or processor cores. The term "multiprocessor" or "processor" may be used to refer to a set of processors.

The RAM 102 is volatile semiconductor memory for temporarily storing therein programs to be executed by the CPU 101 and data to be used by the CPU 101 for its computation. Note that the analyzer 100 may be provided with a different type of memory other than RAM, or may be provided with two or more memory devices.

The HDD 103 is a non-volatile storage device to store therein software programs, such as an operating system (OS) and application software, and various types of data. Note that the analyzer 100 may be provided with a different type of non-volatile storage device, such as flash memory or a solid state drive (SSD), or may be provided with two or more non-volatile storage devices.

The image interface 104 produces video images in accordance with drawing commands from the CPU 101 and displays them on a screen of a display device 111 coupled to the analyzer 100. The display device 111 may be any type of display, such as a cathode ray tube (CRT) display; a liquid crystal display (LCD); an organic electro-luminescence (OEL) display, or a projector.

The input device interface 105 receives an input signal from an input device 112 connected to the analyzer 100 and supplies the input signal to the CPU 101. Various types of input devices may be used as the input device 112, for example, a mouse, a touch panel, a touch-pad, or a keyboard. A plurality of types of input devices may be connected to the analyzer 100.

The media reader 106 is a reading device for reading out programs and data encoded on a storage medium 113. The storage medium 113 may be, for example, a magnetic disk, an optical disk, a magneto-optical disk (MO), or semiconductor memory. Examples of the magnetic disk are a flexible disk (FD) and an HDD. Examples of the optical disk are a compact disc (CD) and a digital versatile disc (DVD).

The media reader 106 copies the programs and data read out from the storage medium 113 to a different storage medium, for example, the RAM 102 or the HDD 103. The read programs are executed, for example, by the CPU 101. Note that the storage medium 113 may be a portable storage medium and used to distribute the programs and data. In addition, the storage medium 113 and the HDD 103 are sometimes referred to as computer-readable storage media.

The communication interface 107 is an interface for communicating with different information processors via a network 114. The communication interface 107 may be a wired communication interface connected via a cable to a wired communication device, such as a switch or router, or may be a wireless communication interface connected via a wireless link to a base station or access point.

Figure 4:
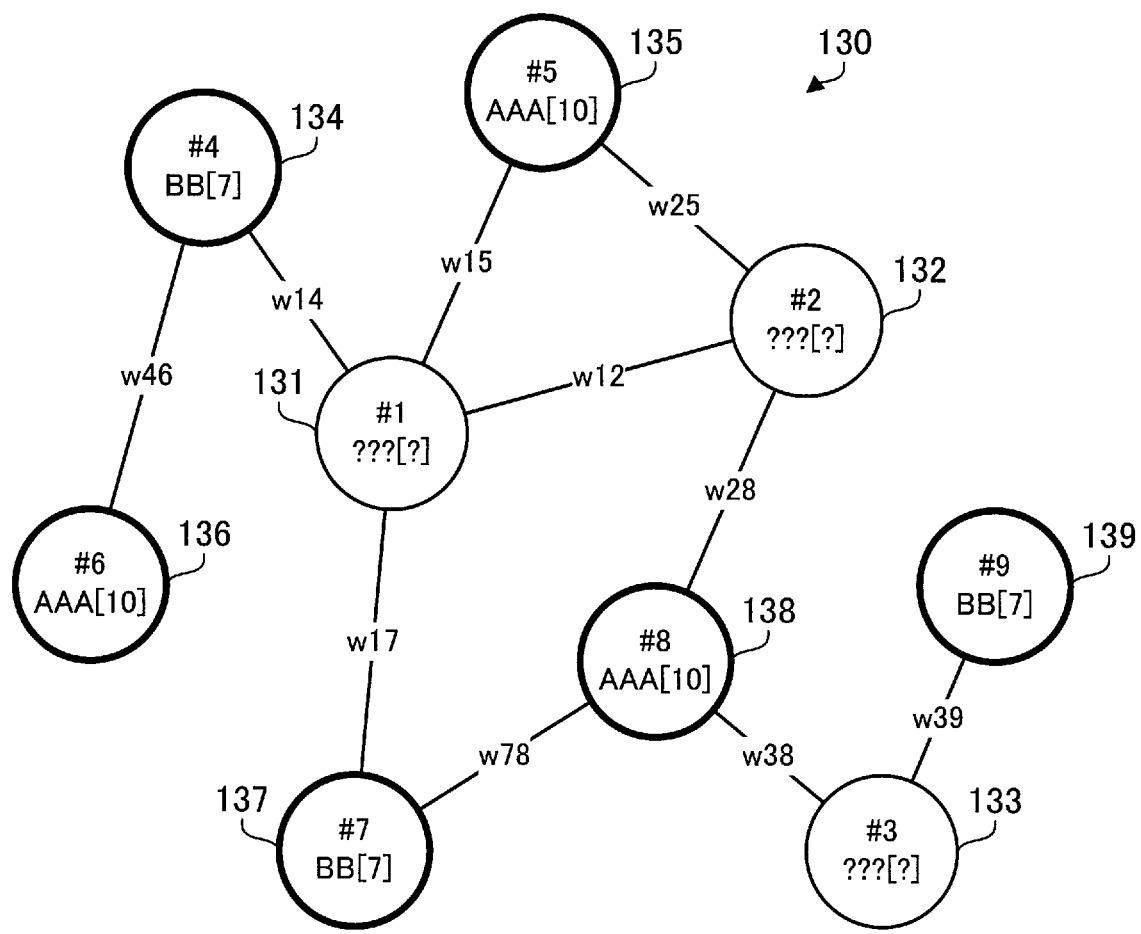
FIG. 4 illustrates an exemplary graph according to the third embodiment.

Next described is a corporate network analyzed by the analyzer 100. FIG. 4 illustrates an exemplary graph according to the third embodiment. A graph 130 is a corporate network including nodes representing companies and edges with weights representing the strengths of relationships between the companies. The weights are non-negative real numbers. A larger weight indicates a stronger relationship between companies at both ends of the edge, and a smaller weight indicates a weaker relationship between them. Since the weights are symmetric and the edges do not have directions, the graph 130 is an undirected graph. When there is no edge directly connecting two nodes, it may be deemed that an edge with a weight of 0 exists between the two nodes. One could see that the weights represent degrees of similarity. When distances are primitively given to the edges, a weight is calculated from each distance. A shorter distance indicates a stronger relationship between companies at both ends of the edge, and a longer distance indicates a weaker relationship between them.

Scores are given to some nodes amongst the nodes included in the graph 130. The scores are node information pieces each indicating an investment rating of a company.

The investment ratings are indexes representing credit risk (default risk) of companies determined by rating agencies. The investment ratings may be used as valuable information for investors to select which companies to invest in. The higher the score, the higher the credibility of the company and the lower the credit risk. On the other hand, the lower the score, the lower the credibility of the company and the higher the credit risk. Generally, investment ratings are often represented by alphabets; however, scores given to the nodes are non-negative real numbers. A rating of AAA corresponds to a score of 10; a rating of AA to a score of 9; a rating of A to a score of 8; a rating of BB to a score of 7; a rating of B to a score of 6; and a rating of C to a score of 5. Thus, possible scores used in the third embodiment are a small set of discrete non-negative real numbers.

Investment ratings are high-cost information because they are manually determined by rating agencies, and it is not possible to acquire investment rating information of all companies. Therefore, the graph 130 mixedly includes nodes with known scores (score-known nodes) and nodes without known scores (score-unknown nodes). Then, the analyzer 100 of the third embodiment estimates unknown scores of the score-unknown nodes based on the known scores given to the score-known nodes and inter-node weights.

As an example, the graph 130 includes nine nodes 131 to 139 (Nodes #1 to #9). Scores of the nodes 131, 132, and 133 are unknown. Each of the nodes 134, 137, and 139 has a score of 7 (i.e., a rating of BB). Each of the nodes 135, 136, and 138 has a score of 10 (a rating of AAA). The node 131 has an edge with a weight w12, connecting to the node 132; an edge with a weight w14, connecting to the node 134; an edge with a weight w15, connecting to the node 135; and an edge with a weight w17, connecting to the node 137. The node 132 has an edge with a weight w25, connecting to the node 135; and an edge with a weight w28, connecting to the node 138. The node 133 has an edge with a weight w38, connecting to the node 138; and an edge with a weight w39, connecting to the node 139. The node 134 has an edge with a weight w46, connecting to the node 136. The node 137 has an edge with a weight w78, connecting to the node 138.

Next described is a method of estimating unknown scores by score propagation between nodes. This unknown score estimation method may be deemed as a type of semi-supervised learning.

For a graph G to be analyzed, a node set V is defined as Equation (1). The node set V is a union of a score-known node set $V_L$ and a score-unknown node set $V_U$, and includes n nodes (n=l+u). The score-known node set $V_L$ includes l score-known nodes $v_1, \ldots,$ and $v_l$ with known scores assigned. The score-unknown node set $V_U$ includes u score-unknown nodes $v_{l+1}, \ldots,$ and $v_{l+u}$ with no known scores assigned.

$$V=\{V_L, V_U\}=\{v_1, \ldots, v_l, v_{l+1}, \ldots, v_{l+u}\} \quad (1)$$

A score vector $\Phi$ defined by Equation (2) is a column vector listing scores in accordance with the node set V. The score vector $\Phi$ is a combination of a known score vector $\Phi_L$ and an unknown score vector $\Phi_U$. The known score vector $\Phi_L$ is a column vector including l scores $\varphi_1, \ldots,$ and $\varphi_l$ corresponding to the score-known node set $V_L$. These l scores are preliminarily given known scores and are invariables (i.e., constants). The unknown score vector $\Phi_U$ is a column vector including u scores $\varphi_{l+1}, \ldots,$ and $\varphi_{l+u}$ corresponding to the score-unknown node set $V_U$. These u scores are variables whose initial values are given at the start of a graph analysis task and then updated during the analysis task. The initial values of the scores $\varphi_{l+1}, \ldots,$ and $\varphi_{l+u}$ are, for example, 0.

$$\Phi=(\Phi_L, \Phi_U)^T=(\varphi_1, \ldots, \varphi_l, \varphi_{l+1}, \ldots, \varphi_{l+u})^T \quad (2)$$

Estimation of an unknown score is defined as calculating the score vector $\Phi$ that minimizes an energy function $E(\Phi)$ defined by Equation (3). Note however that there is a limiting condition that, amongst the scores included in the score vector $\Phi$, the scores of the known score vector $\Phi_L$ are invariables. The energy function $E(\Phi)$ is a function that weights the squared difference of the scores of two nodes connected by each edge by the weight of the edge and adds together the weighted squared differences. The minimization of the energy function $E(\Phi)$ means calculating unknown scores in such a manner that nodes connected by each edge with a larger weight have a smaller difference in their scores and nodes connected by each edge with a smaller weight or those not connected by an edge have a larger difference in their scores.

$$E(\Phi) = \frac{1}{2}\sum_{i,j} w_{ij}(\phi_i - \phi_j)^2 = \Phi^T \Delta \Phi \quad (3)$$

A graph Laplacian $\Delta$ included in Equation (3) is a matrix defined by Equation (4) using an adjacency matrix W and a degree matrix D. The adjacency matrix W is a square matrix of n rows by n columns, representing weights of inter-node edges. The element in row i and column i of the adjacency matrix W corresponds to the $i^{th}$ node $v_i$ amongst the nodes $v_1, \ldots, v_l, v_{l+1}, \ldots,$ and $v_{l+u}$. When there is an edge directly connecting the node $v_i$ and a node $v_j$ and having a weight $w_{ij}$, the element in row i and column j of the adjacency matrix W is $w_{ij}$. If there is no edge directly connecting the nodes $v_i$ and $v_j$, the element in row i and column j of the adjacency matrix W is 0. The adjacency matrix W is a symmetric matrix. Therefore, the analyzer 100 may store only the upper triangular part of the adjacency matrix W.

The degree matrix D is a diagonal matrix in which the diagonal elements equal to the sums of the weights of the incident edges of the individual nodes $v_1, \ldots, v_l, v_{l+1}, \ldots,$ and $v_{l+u}$. The element in row i and column i of the degree matrix D equals to the sum of the weights of edges connected to the node $v_i$. The non-diagonal elements of the degree matrix D are zero. In other words, the degree matrix D is a diagonal matrix whose elements are the row-sums of the adjacent matrix W. The graph Laplacian $\Delta$ is a matrix that denotes the difference between the degree matrix D and the adjacency matrix W.

$$\Delta = D - W = \text{diag}\left(D_{ii} = \sum_j w_{ij}\right) - W \quad (4)$$

Each edge may have a "distance" value assigned by the user, where a smaller distance value indicates stronger connectivity between the incident nodes while a larger distance value indicates weaker connectivity between them. In that case, each distance value may be converted to a weight using, for example, Gaussian kernel function, as given by Equation (5). A larger weight indicates stronger connectivity between the incident nodes while a smaller weight indicates weaker connectivity between them. Note that, in Equation (5), $d(v_i, v_j)$ is a distance value assigned to the edge between the nodes $v_i$ and $v_j$, and $\sigma^2$ is the variance of distance values included in the graph G.

$$w_{ij} = \exp\left(-\frac{d(v_i, v_j)^2}{\sigma^2}\right) \quad (5)$$

The graph Laplacian $\Delta$ is a real symmetric positive semidefinite matrix. Therefore, an optimization problem to minimize the energy function $E(\Phi)$ is a convex quadratic program subject to only a linear equality constraint, and has a global optimal solution. The energy function $E(\Phi)$ is represented by a harmonic function satisfying Laplace's equation $\Delta\Phi=0$. Specifically, the following Equation (6) is true for an unknown score $\varphi_i$ of a score-unknown node $v_i$. The unknown score $\varphi_i$ is the weighted average of scores $\varphi_j$ of neighboring nodes $v_j$ connected to the score-unknown node $v_i$ by edges. Note however that the unknown score $\varphi_i$ is not directly determined because the neighboring nodes may include score-unknown nodes.

$$\phi_i = \frac{1}{D_{ii}} \sum_j w_{ij}\phi_j \text{ where } v_i \in V_U \quad (6)$$

Next described is an absorbing Markov chain based on a random walk model, which is an algorithm used to procedurally calculate an unknown score. In an absorbing Markov process for score propagation, a token starts at a score-unknown node and randomly moves to a different node with a probability according to a weight. If the node to which the token has moved is a score-unknown node, the token again moves to a different node randomly. On the other hand, if the node to which the token has moved is a score-known node, the known score of the score-known node is obtained, and the token disappears by being absorbed by the score-known node. By causing a large number of tokens to perform random walks, starting from the same score-unknown node, known scores are obtained by the tokens. An expected value calculated using the obtained known scores is then used as an estimate for the unknown score of the starting score-unknown node.

Such an absorbing Markov chain may be represented as a matrix operation that iteratively multiplies an initial value of the score vector $\Phi$ by a predetermined matrix. As defined by Equation (7), a score vector $\Phi^{(t)}$ at given time point t is obtained by multiplying a score vector $\Phi^{(t-1)}$ at time point t−1 by a transition probability matrix P. The transition probability matrix P is a square matrix of n rows by n columns, representing inter-node transition probabilities. The element in row i and column i of the transition probability matrix P corresponds to row i of the score vector $\Phi$, that is, the $i^{th}$ node $v_i$ amongst the nodes $v_1, \ldots, v_l, v_{l+1}, \ldots,$ and $v_{l+u}$.

$$\Phi^{(t)} = P\Phi^{(t-1)} \quad (7)$$

As given by Equation (8), the element in row i and column j of the transition probability matrix P is a transition probability $p_{ij}$ from the node $v_i$ to the node $v_j$. In the score vector $\Phi$, the known score vector $\Phi_L$ is located in the upper side while the unknown score vector $\Phi_U$ is located in the lower side. Therefore, the transition probability matrix P is divided into an upper-left submatrix $P_{LL}$, an upper-right submatrix $P_{LU}$, a lower-left submatrix $P_{UL}$, and a lower-right submatrix $P_{UU}$. The submatrix $P_{LL}$ represents transition probabilities from score-known nodes to score-known nodes. The submatrix $P_{LU}$ represents transition probabilities from score-known nodes to score-unknown nodes. The submatrix $P_{UL}$ represents transition probabilities from score-unknown nodes to score-known nodes. The submatrix $P_{UU}$ represents transition probabilities from score-unknown nodes to score-unknown nodes.

In the absorbing Markov process, once reaching a score-known node, a token stays in this score-known node from that point onwards, without moving to a different score-known node or a score-unknown node. Therefore, the submatrix $P_{LL}$ is replaceable with an identity matrix I with its on-diagonal elements being 1 and off-diagonal elements being 0. In addition, the submatrix $P_{LU}$ is replaceable with a zero matrix O with all the elements being 0. Hence, the transition probability matrix P is reduced to a matrix with the identity matrix I at the upper left, the zero matrix O at the upper right, the submatrix $P_{UL}$ at the lower left, and the submatrix $P_{UU}$ at the lower right. Note that the identity matrix I is of size l rows by l columns; the zero matrix O is of size l rows by u columns; the submatrix $P_{UL}$ is of size u rows by l columns; and the submatrix $P_{UU}$ is of size u rows by u columns. The transition probability matrix P before the reduction is the product of the inverse $D^{-1}$ of the degree matrix D and the adjacency matrix W, as defined by Equation (9).

$$P = [p_{ij}] = \begin{pmatrix} P_{LL} & P_{LU} \\ P_{UL} & P_{UU} \end{pmatrix} = \begin{pmatrix} I & O \\ P_{UL} & P_{UU} \end{pmatrix} \quad (8)$$

$$P = D^{-1}W \quad (9)$$

In iterative matrix operations using the reduced transition probability matrix P, a known score vector $\Phi_L^{(t)}$ of the score vector $\Phi^{(t)}$ at time point t remains unchanged from a known score vector $\Phi_L^{(0)}$ at time point 0, as represented by Equation (10). That is, the known score vector $\Phi_L^{(t)}$ at time point t matches the known score vector $\Phi_L$ given before the score propagation. On the other hand, an unknown score vector $\Phi_U^{(t)}$ of the score vector $\Phi^{(t)}$ at time point t is calculated by Equation (11). An unknown score vector $\Phi_U^{(0)}$ at time point 0 included in Equation (11) is a suitable initial value set at the start of score propagation, and may be a zero vector.

$$\Phi_L^{(t)} = \Phi_L^{(0)} = \Phi_L \quad (10)$$

$$\Phi_U^{(t)} = P_{UL}\Phi_L^{(t-1)} + P_{UU}\Phi_U^{(t-1)} \quad (11)$$

$$= \sum_{n=1}^{t} P_{UU}^{n-1} P_{UL}\Phi_L^{(0)} + P_{UU}^t \Phi_U^{(0)}$$

As a result, an estimate of the unknown score vector $\Phi_U$ is defined as the limit of the score vector $\Phi^{(t)}$ at time point t, as represented by Equation (12). Note that Equation (12) includes the inverse matrix of $I-P_{UU}$. Therefore, the estimate may be obtained either by iterative operations based on Equation (11), or based on Equation (12).

$$\hat{\Phi}_U = \lim_{t\to\infty} \Phi_U^{(t)} = (I - P_{UU})^{-1} P_{UL}\Phi_L \quad (12)$$

However, what is important is computational effort to calculate the unknown scores by score propagation. In Equation (12), the computational effort to calculate the inverse matrix of $I-P_{UU}$ is in the order of $u^3$. The computational effort to multiply the inverse matrix by the submatrix $P_{UL}$ is in the order of $u^2 \times l$. The computational effort to multiply the result of the multiplication of the submatrix $P_{UL}$ by the known score vector $\Phi_L$ is in the order of $u \times l$.

In view of the above, the third embodiment offers savings in computational effort in estimating the unknown scores by contracting the graph. In an absorbing Markov chain, as long as the known scores of score-known nodes to which tokens have individually reached are the same, differences among the reached score-known nodes do not affect estimation results. On the other hand, a small number of discrete numerical values representing investment ratings are used as scores according to the third embodiment. Hence, a plurality of score-known nodes included in the graph is arranged into groups according to their known scores, and a single virtual node is used as each representative of score-known nodes belonging to the same group. By reducing the number of score-known nodes l, it is possible to achieve savings in computational effort for the submatrix $P_{UL}$ multiplication and the known score vector $\Phi_L$ multiplication in Equation (12).

Figure 5:
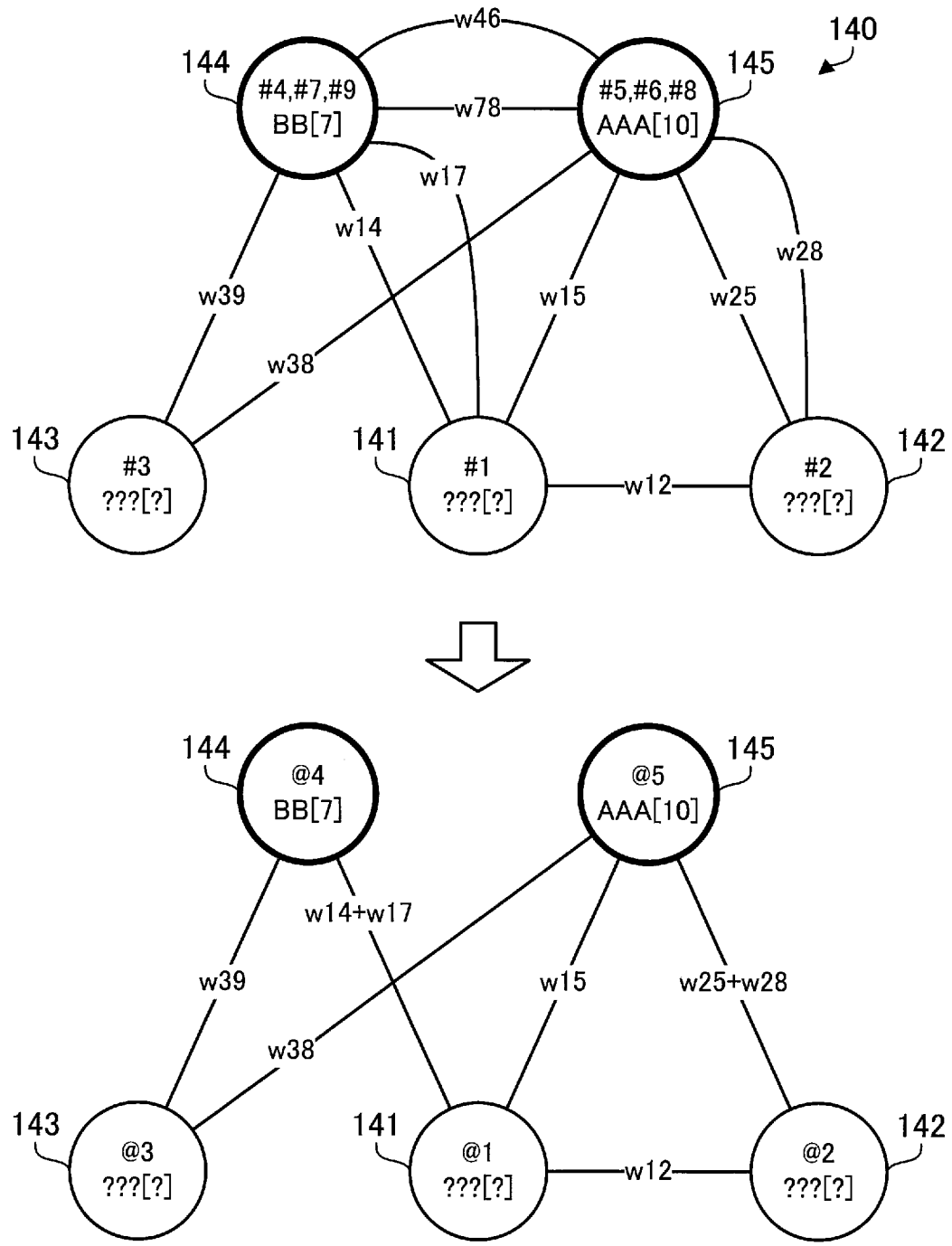
FIG. 5 illustrates exemplary graph contraction according to the third embodiment.

FIG. 5 illustrates exemplary graph contraction according to the third embodiment. A contracted graph 140 transformed from the aforementioned graph 130 includes nodes 141 to 145. The nodes 141, 142, and 143 are score-unknown nodes and corresponds to the nodes 131, 132, and 133, respectively, of the graph 130. The nodes 144 and 145 are score-known nodes, and have a score of 7 (a rating of BB) and a score of 10 (a rating of AAA), respectively.

In transforming the graph 130 to the contracted graph 140, the analyzer 100 groups the nodes 134, 137, and 139 having the same score of 7, and replaces them with the single node 144. Similarly, the analyzer 100 groups the nodes 135, 136, and 138 having the same score of 10, and replaces them with the single node 145.

When the score-known nodes are aggregated, each inter-node edge is still maintained. As a result, two or more edges (multiple edges) may be formed between two nodes. The node 141 has an edge with the weight w12, connecting to the node 142; an edge with the weight w14 and an edge with the weight w17, connecting to the node 144; and an edge with the weight w15, connecting to the node 145. The node 142 has an edge with the weight w25 and an edge with the weight w28, connecting to the node 145. The node 143 has an edge with the weight w38, connecting to the node 145; and an edge with the weight w39, connecting to the node 144. The node 144 has an edge with the weight w46 and an edge with the weight w78, connecting to the node 145.

The existence of multiple edges makes matrix calculation complicated. On the other hand, if the weights of the edges are changed, the estimation results of the unknown scores would change from those obtained before the graph contraction. Hence, for each node pair, multiple edges are aggregated by adding together the weights of the edges so as not to produce changes in the estimation results of the unknown scores. Note also that tokens do not move from one score-known node to another. For this reason, edges between score-known nodes are deleted.

Specifically, the analyzer 100 assigns a new node identifier (ID) of "@1" to the node 141, a new node ID of "@2" to the node 142, and a new node ID of "@3" to the node 143. The analyzer 100 also assigns a new node ID of "@4" to the node 144 and a new node ID of "@5" to the node 145. The analyzer 100 aggregates the multiple edges between the nodes 141 and 144 to form an edge having a weight w14+w17 and also aggregates the multiple edges between the nodes 142 and 145 to form an edge having a weight w25+w28. Further, the analyzer 100 deletes the edges between the nodes 144 and 145.

With the above-described transformation, the node 141 has an edge with the weight w12, connecting to the node 142; an edge with the weight w14+w17, connecting to the node 144; and an edge with the weight w15, connecting to the node 145. The node 142 has an edge with the weight w25+w28, connecting to the node 145. The node 143 has an edge with the weight w38, connecting to the node 145; and an edge with the weight w39, connecting to the node 144.

With the transformation of the graph 130 to the contracted graph 140, the number of nodes is reduced from 9 to 5, and the number of edges is reduced from 10 to 6. Using the contracted graph 140 in place of the graph 130 provides savings in computational effort for calculating unknown scores of the nodes 131, 132, and 133. Note also that the estimation results remain the same between the graph 130 and the contracted graph 140.

Figure 6:
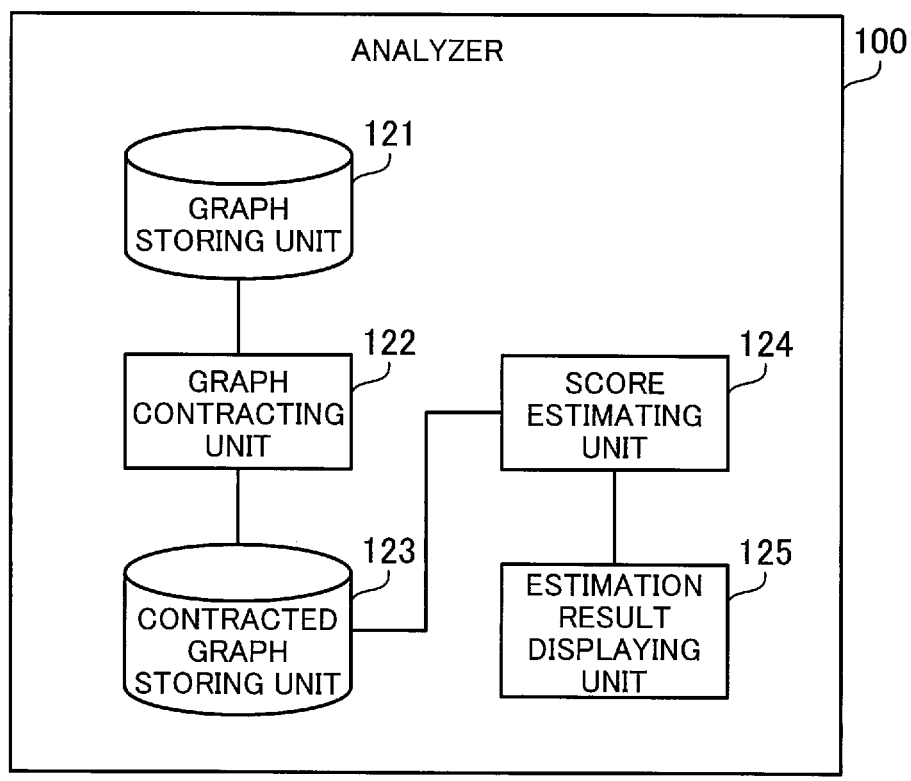
FIG. 6 is a block diagram illustrating exemplary functions of the analyzer according to the third embodiment.

Next described are functions of the analyzer 100. FIG. 6 is a block diagram illustrating exemplary functions of the analyzer according to the third embodiment. The analyzer 100 includes a graph storing unit 121, a graph contracting unit 122, a contracted graph storing unit 123, a score estimating unit 124, and an estimation result displaying unit 125. The graph storing unit 121 and the contracted graph storing unit 123 are implemented using a storage area secured, for example, in the RAM 102 or the HDD 103. The graph contracting unit 122, the score estimating unit 124, and the estimation result displaying unit 125 are implemented, for example, using programs executed by the CPU 101.

The graph storing unit 121 stores graph information representing a graph before contraction. The graph information is preliminarily created by the user. The graph information includes node IDs used to identify nodes included in the graph, inter-node weights, and known scores assigned to some nodes.

The graph contracting unit 122 generates, from the graph information stored in the graph storing unit 121, contracted graph information representing a contracted graph and stores the contracted graph information in the contracted graph storing unit 123. The contracted graph is such that score-known nodes having the same known score have been aggregated, multiple edges between nodes have been aggregated, and edges between score-known nodes have been deleted. The contracted graph information includes new node IDs used to identify nodes included in the contracted graph, inter-node weights obtained after the aggregation of the multiple edges, and known scores assigned to some nodes.

The contracted graph storing unit 123 stores the contracted graph information.

The score estimating unit 124 estimates unknown scores using the contracted graph information stored in the contracted graph storing unit 123 instead of the graph information stored in the graph storing unit 121. Specifically, the score estimating unit 124 calculates the transition probability matrix P from the adjacency matrix W listing the inter-node weights indicated by the contracted graph information and iteratively multiplies the score vector $\Phi$ by the transition probability matrix P, to thereby estimate unknown scores of score-unknown nodes. The score estimating unit 124 outputs estimation results of the unknown scores to the estimation result displaying unit 125.

The estimation result displaying unit 125 causes the display device 111 to display a screen such as a score estimation request screen and a score estimation result screen, to thereby provide the user with a visual interface. The estimation result displaying unit 125 receives, on the score estimation request screen, a designation of score-unknown nodes whose scores are to be estimated and then instructs the score estimating unit 124 to perform score estimation. The estimation result displaying unit 125 acquires estimated scores from the score estimating unit 124 and displays the score estimation result screen. Note that the analyzer 100 may store the estimated scores in a non-volatile storage device, output them to an output device other than the display device 111, or transmit them to a different information processor.

FIG. 7 illustrates exemplary graph information according to the third embodiment. Graph information 151 is stored in the graph storing unit 121. The graph information 151 represents the graph 130 of FIG. 4. The graph information 151 includes scores associated with the node IDs individually indicating the nodes 131 to 139. A score associated with each score-known node is a numerical value indicating an investment rating of a company represented by the score-known node. A score associated with each score-unknown node is set to a numerical value of −1, which indicates that the score of the node is unknown. The graph information 151 also includes the weights w12, w14, w15, w17, w25, w28, w38, w39, w46, and w78 of ten edges among the nodes 131 to 139.

Figure 8:
FIG. 8 illustrates exemplary contracted graph information according to the third embodiment.

FIG. 8 illustrates exemplary contracted graph information according to the third embodiment. Graph information 152 is transformed from the graph information 151 and represents interim progress of graph contraction. The graph information 152 corresponds to the state of the contracted graph 140, depicted in the upper part of FIG. 5.

The graph contracting unit 122 groups node IDs having the same score other than "−1". The graph contracting unit 122 assigns a new node ID to each node ID such that the same new node ID is given to node IDs belonging to the same group. Next, the graph contracting unit 122 scans the adjacency matrix row by row to check if each row includes two or more weights associated with the same new node ID. If there are such two or more weights, the weights are added together. The graph contracting unit 122 aggregates columns of the adjacency matrix, associated with the same new node ID, and also aggregates rows of the adjacency matrix, associated with the same new node ID. Finally, the graph contracting unit 122 replaces each weight between score-known nodes with 0.

Herewith, the graph information 152 is transformed into contracted graph information 153. The contracted graph information 153 is stored in the contracted graph storing unit 123. The contracted graph information 153 corresponds to the state of the contracted graph 140, depicted in the lower part of FIG. 5. According to the contracted graph information 153, the weights w14 and w17 in the graph information 152 have been added together, and the weights w25 and w28 in the graph information 152 have been added together. In addition, the weights w46 and w78 in the graph information 152 have been deleted from the contracted graph information 153.

Figure 9:
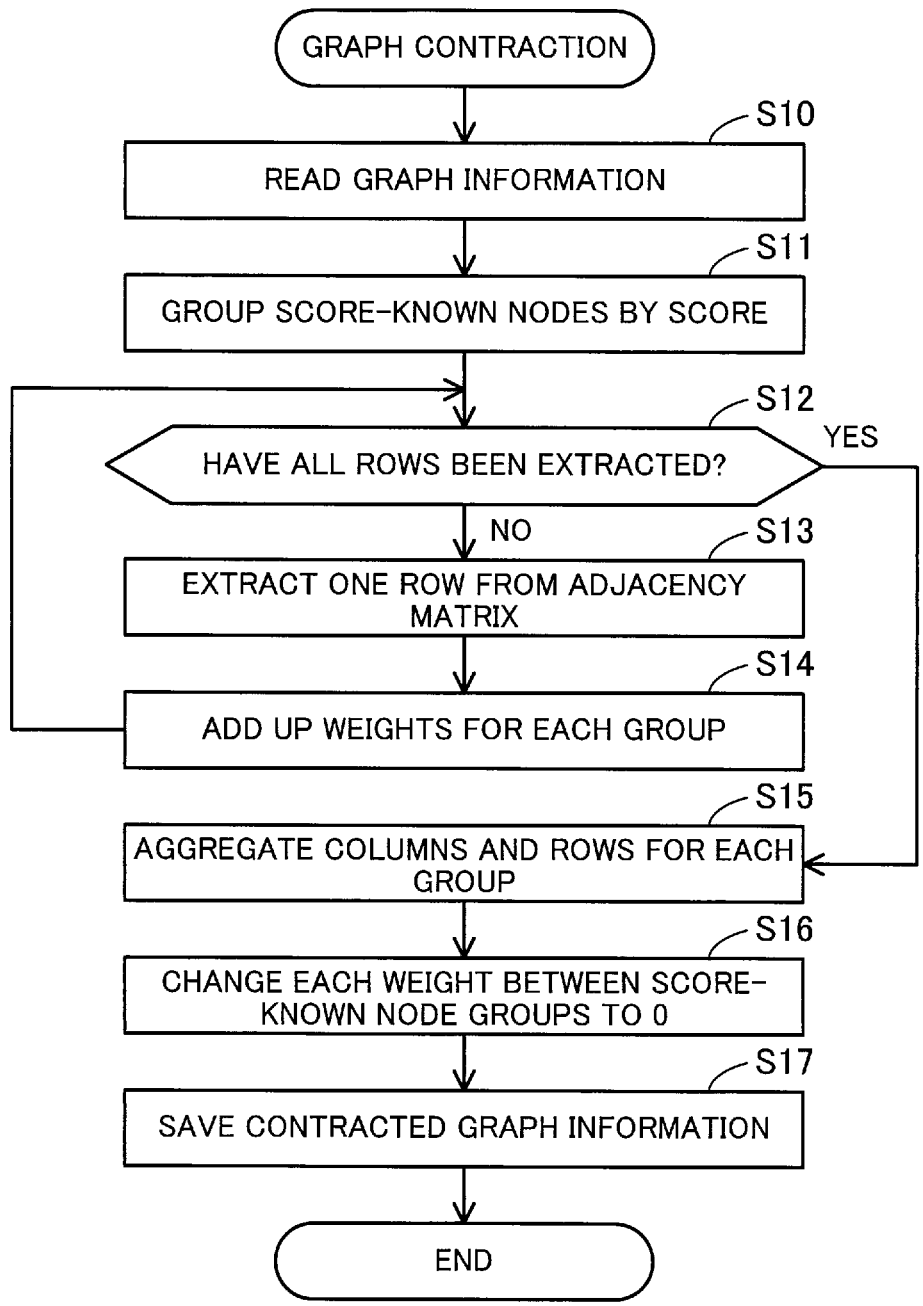
FIG. 9 is a flowchart illustrating an exemplary procedure for graph contraction according to the third embodiment.

Next described is a processing procedure of the analyzer 100. FIG. 9 is a flowchart illustrating an exemplary procedure for graph contraction according to the third embodiment.

(Step S10) The graph contracting unit 122 reads the graph information from the graph storing unit 121.

(Step S11) The graph contracting unit 122 checks known scores of score-known nodes indicated by the graph information and groups the score-known nodes by score. The graph contracting unit 122 assigns a unique new node ID to each of the score-known node groups and each score-unknown node. That is, the same new node ID is assigned to each score-known node belonging to the same group.

(Step S12) The graph contracting unit 122 determines whether all rows of the adjacency matrix included in the graph storing unit 121 have been extracted. If all the rows have been extracted, the process moves to step S15. If any pending row remains, the process moves to step S13.

(Step S13) The graph contracting unit 122 extracts one row from the adjacency matrix.

(Step S14) The graph contracting unit 122 sorts, amongst weights included in the extracted row, weights whose incident nodes on the other side are score-known nodes into score-known node groups. The graph contracting unit 122 adds together the weights of each group. Herewith, multiple edges between a node corresponding to the extracted row and each group are aggregated. Then, the process moves to step S12.

(Step S15) The graph contracting unit 122 aggregates, in the adjacency matrix, columns of the same new node ID. Each weight after the aggregation is the corresponding summed one obtained in step S14. The graph contracting unit 122 also aggregates rows of the adjacency matrix in conformity with the columns of the adjacency matrix after the aggregation.

(Step S16) The graph contracting unit 122 identifies, in the contracted adjacency matrix, each pair of a row and a column individually corresponding to a score-known node group, and replaces the weight between the identified pair with 0.

(Step S17) The graph contracting unit 122 saves, in the contracted graph storing unit 123, contracted graph information including the new node IDs, the known scores, and the contracted adjacency matrix.

Figure 10:
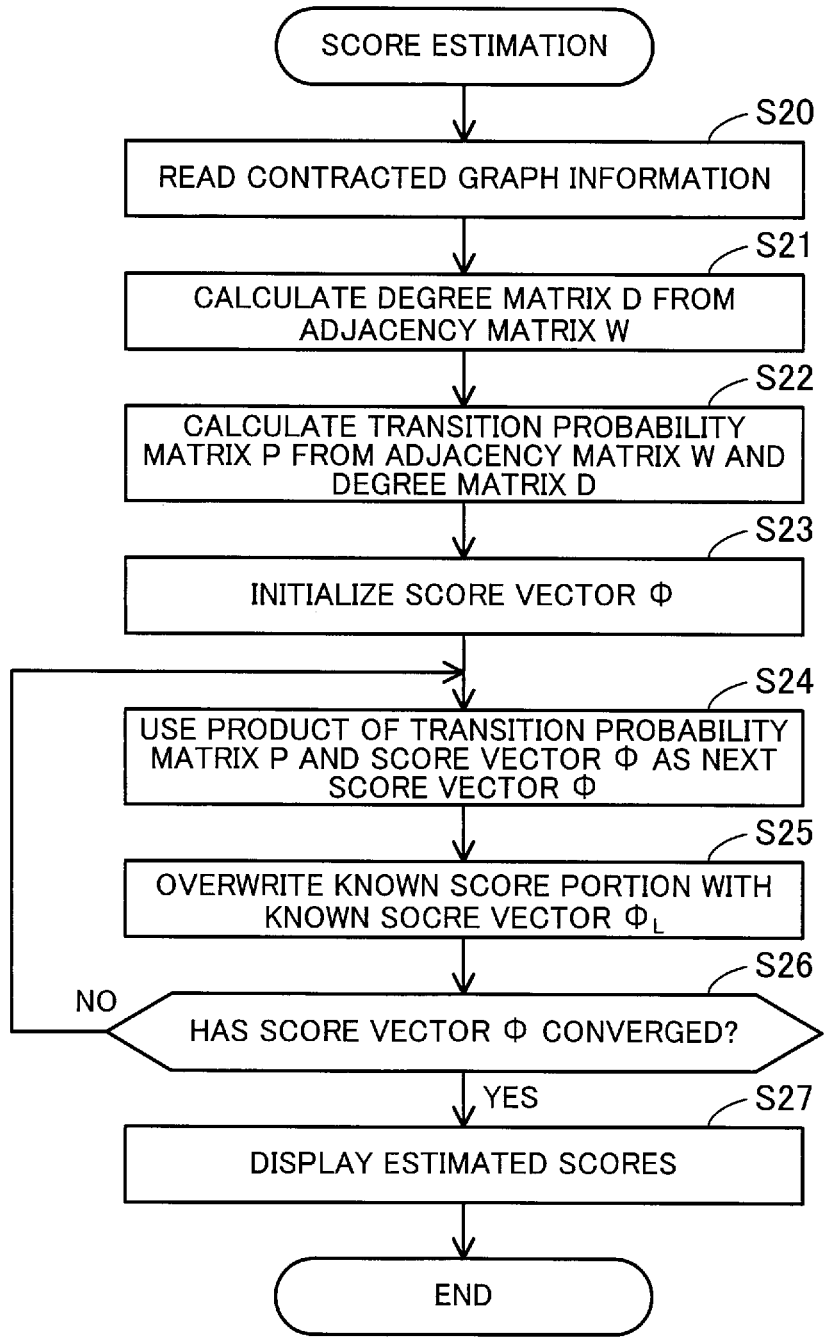
FIG. 10 is a flowchart illustrating an exemplary procedure for score estimation according to the third embodiment.

FIG. 10 is a flowchart illustrating an exemplary procedure for score estimation according to the third embodiment.

(Step S20) The score estimating unit 124 reads the contracted graph information from the contracted graph storing unit 123. The contracted graph information includes the adjacency matrix W and the known score vector $\Phi_L$ associated with a contracted graph created by aggregating score-known nodes and adding together weights of multiple edges.

(Step S21) The score estimating unit 124 calculates, from the adjacency matrix W, the degree matrix D representing, for each node, the sum of weights of edges connected to the node.

(Step S22) The score estimating unit 124 calculates, from the adjacency matrix W and the degree matrix D, the transition probability matrix P representing, for each node, the probability for a token to move to a different node.

(Step S23) The score estimating unit 124 initializes the score vector $\Phi$. The score vector $\Phi$ is a combination of the known score vector $\Phi_L$ and the unknown score vector $\Phi_U$. The known score vector $\Phi_L$ used here is one included in the contracted graph information. The initial value of the unknown score vector $\Phi_U$ is predetermined (e.g. a zero vector).

(Step 324) The score estimating unit 124 calculates the product of the transition probability matrix P and the score vector $\Phi$, and uses the calculated product as the next score vector $\Phi$.

(Step S25) The score estimating unit 124 overwrites, within the score vector Φ updated in step S24, the known score portion with the known score vector $Φ_L$.

(Step S26) The score estimating unit 124 determines if the score vector Φ has converged. For example, if the current score vector Φ remains the same as the last one, the score estimating unit 124 determines that the score vector Φ has converged. Note however that even though the current score vector Φ is different from the last one, if the difference is less than a threshold, the score estimating unit 124 may determine that the score vector Φ has converged. If the score vector Φ has converged, the process moves to step S27. If not, the process moves to step S24.

(Step 327) The score estimating unit 124 approximates each score included in the score vector Φ by the best approximation among predetermined discrete numerical values, such as 10, 9, 8, 7, 6, and 5. For example, a calculated score of 7.2 is approximated as 7 (a rating of BB). The estimation result displaying unit 125 causes the display device 111 to display a score estimation result screen including the estimated scores.

According to the analyzer 100 of the third embodiment, score-known nodes included in a graph are grouped by score, and two or more score-known nodes having the same score are aggregated into a single score-known node. In addition, multiple edges created by the score-known node aggregation are aggregated into a single edge with a summed weight. Then, based on the contracted graph thus generated, score propagation is performed to estimate unknown scores from known scores.

Herewith, it is possible to offer savings in computational effort for score propagation. This therefore results in increased speed of a corporate network analysis task for estimating, from investment ratings of some companies, those of other companies. In addition, the aggregation of the score-known nodes having the same score produces no change in known scores of nodes reached by random walks, and the summation of weights of the multiple edges preserves transition probabilities between nodes, thus causing no change in the estimation results of the unknown scores. As a result, analytical accuracy is maintained.

A fourth embodiment is described next. While omitting repeated explanations, the following description focuses on differences from the third embodiment above.

An analyzer according to the fourth embodiment provides savings in computational effort for estimating unknown scores, as in the third embodiment; however, it uses a different method to reduce computational effort. The analyzer of the fourth embodiment may have the same hardware configuration as the analyzer 100 of FIG. 3.

Figure 11:
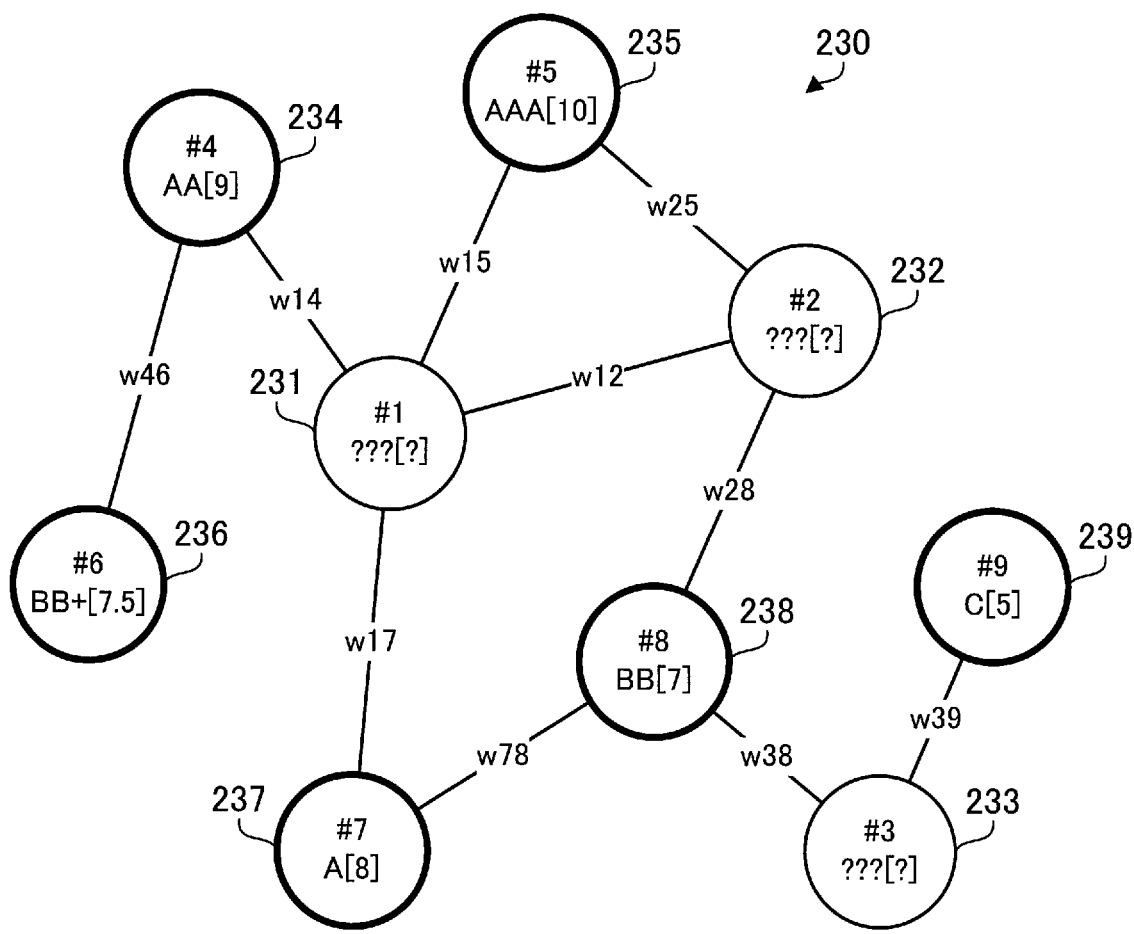
FIG. 11 illustrates an exemplary graph according to a fourth embodiment.

FIG. 11 illustrates an exemplary graph according to the fourth embodiment. A graph 230 is used to explain the fourth embodiment. The graph 230 is a corporate network including nodes representing companies and edges with weights representing the strengths of relationships between the companies, as with the graph 130 of the third embodiment. Scores each indicating an investment rating are assigned to some nodes amongst the nodes included in the graph 230. Note here that the assigned scores are different from those in the graph 130 of the third embodiment.

The graph 230 includes nodes 231 to 239 (Nodes #1 to #9). Scores of the nodes 231, 232, and 233 are unknown. The node 234 has a score of 9 (a rating of AA). The node 235 has a score of 10 (a rating of AAA). The node 236 has a score of 7.5 (a rating of BB+). The node 237 has a score of 8 (a rating of A). The node 238 has a score of 7 (a rating of BB). The node 239 has a score of 5 (a rating of C).

The node 231 has an edge with a weight w12, connecting to the node 232; an edge with a weight w14, connecting to the node 234; an edge with a weight w15, connecting to the node 235; and an edge with a weight w17, connecting to the node 237. The node 232 has an edge with a weight w25, connecting to the node 235; and an edge with a weight w28, connecting to the node 238. The node 233 has an edge with a weight w38, connecting to the node 238; and an edge with a weight w39, connecting to the node 239. The node 234 has an edge with a weight w46, connecting to the node 236. The node 237 has an edge with a weight w78, connecting to the node 238.

A method of reducing computational effort according to the fourth embodiment is described hereinafter.

A graph to be analyzed may include a plurality of disconnected subgraphs (disconnected components). A node belonging to a disconnected subgraph is not reachable from a node in a different subgraph through one or more edges. On the other hand, in unknown score estimation using an absorbing Markov chain, known scores are obtained as tokens move between nodes based on transition probabilities of individual edges. A token starting from a score-unknown node belonging to one subgraph would not reach a score-known node of a different disconnected subgraph. Therefore, the estimate of an unknown score in a subgraph is free of influence from known scores of different disconnected subgraphs.

Hence, when the graph includes a plurality of disconnected subgraphs, running an algorithm for unknown score estimation on each subgraph gives the same estimation results as in the case of running an algorithm for unknown score estimation on the entire graph. That is, dividing the adjacency matrix into parts provides savings in computational effort without affecting the estimation results of unknown scores. Extraction of a single connected subgraph (connected component) from a graph is achieved by finding a spanning tree, for example, by depth-first search launched from a given node and moving along edges.

Note however that when huge connected subgraphs with a large number of nodes exist in a graph, simply dividing the graph into connected subgraphs does not sometimes yield sufficient savings in computational effort. Especially, corporate networks may include huge connected subgraphs (sometimes referred to as "cores" or "gigantic clusters") with nodes that represent some companies, being hubs, because certain companies such as financial institutions, holding companies, and trading companies have business relationships with a large number of other companies.

In view of the above, the fourth embodiment is directed to further breaking a huge connected subgraph into smaller segments without affecting estimation results of unknown scores, focusing on characteristics of an absorbing Markov chain. In an absorbing Markov chain, each token starting from a score-unknown node is absorbed by a first score-known node that the token has reached and does not move to a different node thereafter. Therefore, in an absorbing Markov chain, all other nodes belonging to the same connected subgraph are not always reachable from a score-unknown node. As in the case of dividing a graph into connected subgraphs, estimation results of unknown scores are free of influence from known scores of unreachable score-known nodes.

For example, the nodes 231 to 239 constitute one connected subgraph. From the node 231, the nodes 232, 234, 235, 237, and 238 are reachable; however, the nodes 233, 236, and 239 are unreachable. From the node 232, the nodes 231, 234, 235, 237, and 238 are reachable; however, the nodes 233, 236, and 239 are unreachable. From the node 233, the nodes 238 and 239 are reachable; however, the nodes 231, 232, 234, 235, 236, and 237 are unreachable.

Hence, focusing on the characteristics of an absorbing Markov chain, it is possible to further split a huge connected subgraph into smaller components by virtually treating score-known nodes as end vertices. The subdivision of one connected subgraph in this manner has no influence on estimation results of unknown scores.

Figure 12:
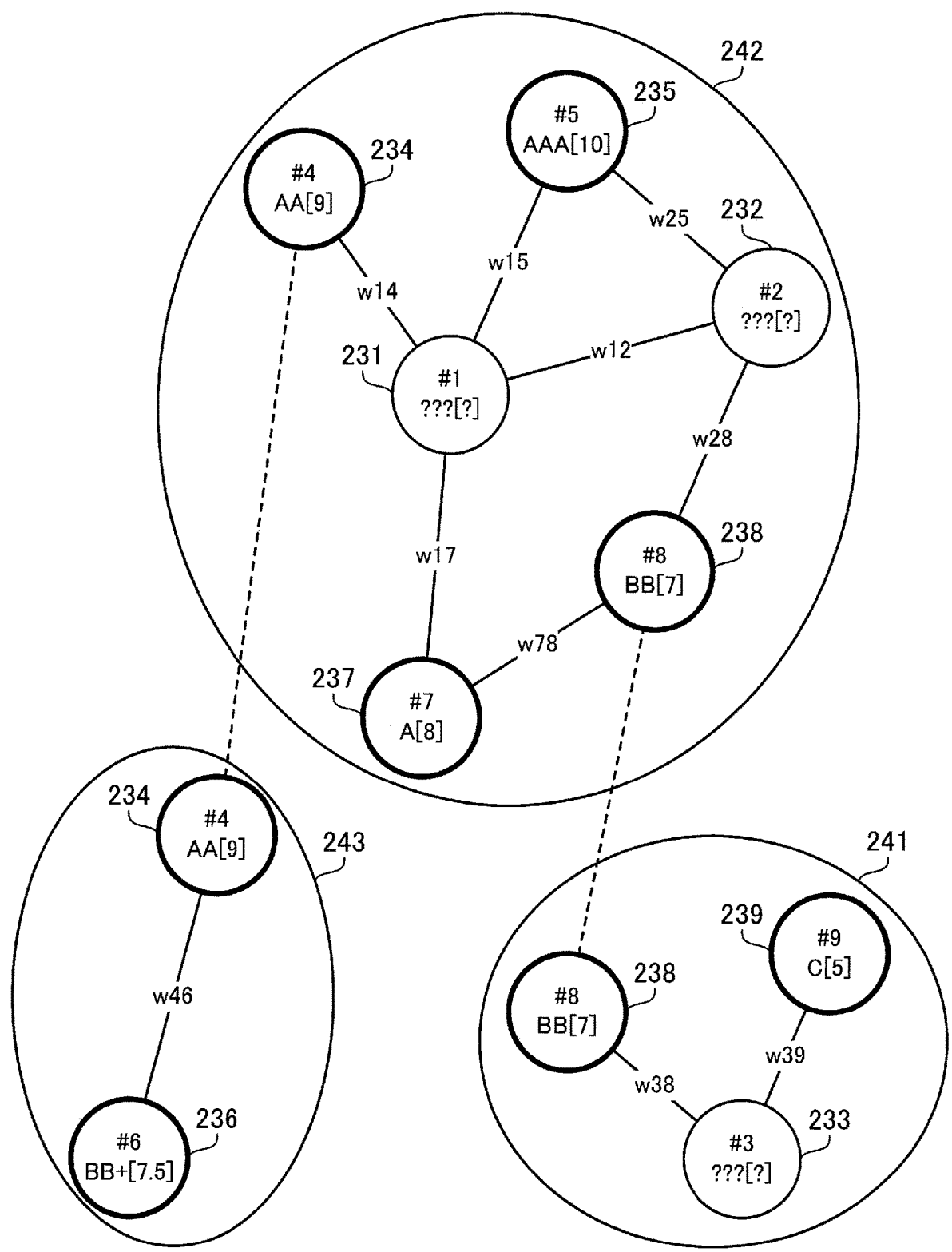
FIG. 12 illustrates exemplary graph partitioning according to the fourth embodiment.

FIG. 12 illustrates exemplary graph partitioning according to the fourth embodiment. The graph 230 is partitioned into clusters 241, 242, and 243. These clusters are extracted by depth-first search which regards score-known nodes as end vertices.

When the node 233, which is a score-unknown node, is set as a start vertex, depth-first search reaches the node 238 from the node 233 along an edge. The node 238 is a score-known node and, therefore, no edge beyond the node 238 is selected. The search returns to the node 233 and then reaches the node 239 from the node 233 along an edge. The node 239 is a score-known node and, therefore, no edge beyond the node 239 is selected. The search launched from the node 233 returns to the node 233 and then ends since there is no more selectable edge left.

As a result, the cluster 241 including the nodes 233, 238, and 239 is separated from the graph 230. Note however that, because the node 238 is also connected to nodes external to the cluster 241, a copy of the node 238 is made and left in the graph 230 so as not to eliminate edges.

Next, depth-first search starts from the node 231, which is a remaining score-unknown node, and reaches the node 234 along an edge. The node 234 is a score-known node and, therefore, no edge beyond the node 234 is selected. The search returns to the node 231 and then reaches the node 232 along an edge. The node 232 is a score-unknown node and, therefore, the search proceeds beyond the node 232 and reaches the node 235 from the node 232 along an edge. The node 235 is a score-known node and, therefore, no edge beyond the node 235 is selected.

The search returns to the node 232 and then reaches the node 238 along an edge. The node 238 is a score-known node and, therefore, no edge beyond the node 238 is selected. The search returns to the node 232, and then returns to the node 231 since there is no more selectable edge left. Subsequently, the search reaches the node 235 along an edge. Because the node 235 has already been reached, no edge beyond the node 235 is selected. The search returns to the node 231 and then reaches the node 237 along an edge. The node 237 is a score-known node and, therefore, no edge beyond the node 237 is selected. The search launched from the node 231 returns to the node 231 and then ends since there is no more selectable edge left.

As a result, the cluster 242 including the nodes 231, 232, 234, 235, 237, and 238 is separated from the graph 230. Note however that, because the node 234 is also connected to a node external to the cluster 242, a copy of the node 234 is made and left in the graph 230. Finally, the cluster 243 including the remaining nodes 234 and 236 is formed. With respect to each of the clusters 241, 242, and 243, an adjacency matrix is generated and an algorithm for unknown score estimation is implemented. This enables savings in computational effort without affecting estimation results.

Figure 13:
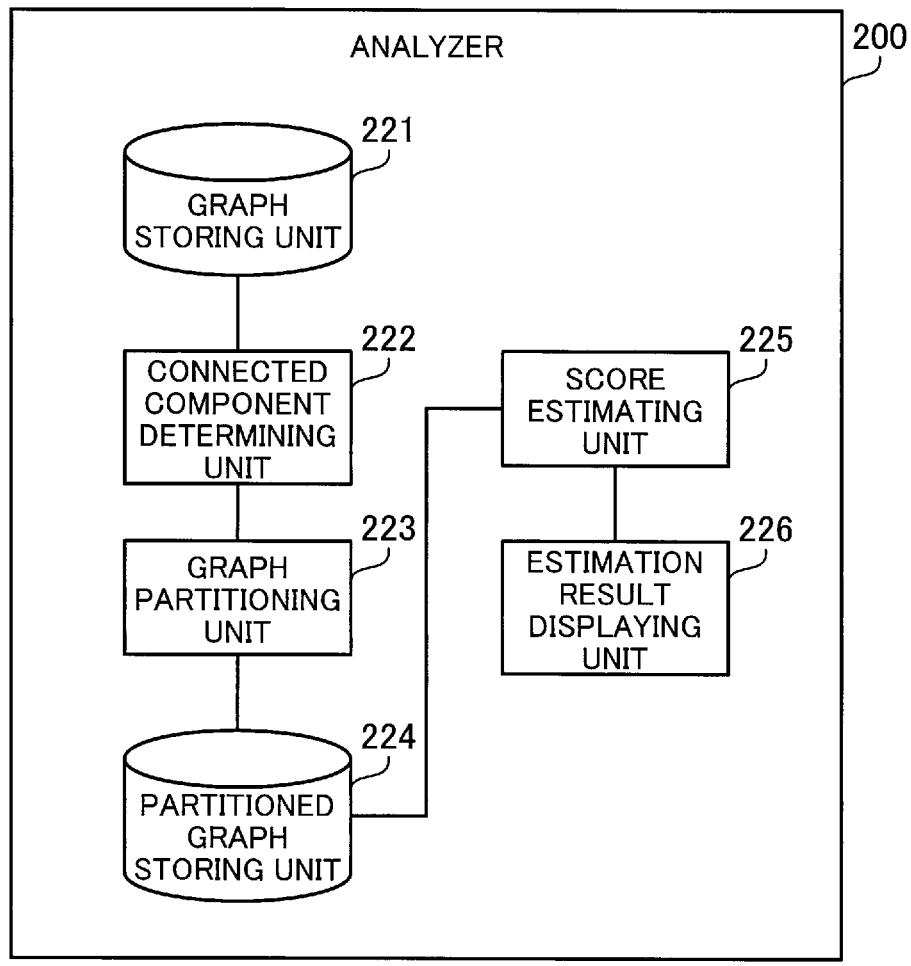
FIG. 13 is a block diagram illustrating exemplary functions of an analyzer according to the fourth embodiment.

Next described are functions of the analyzer according to the fourth embodiment. FIG. 13 is a block diagram illustrating exemplary functions of the analyzer according to the fourth embodiment.

An analyzer 200 according to the fourth embodiment includes a graph storing unit 221, a connected component determining unit 222, a graph partitioning unit 223, a partitioned graph storing unit 224, a score estimating unit 225, and an estimation result displaying unit 226. The graph storing unit 221 and the partitioned graph storing unit 224 are implemented using a storage area secured, for example, in RAM or HDD of the analyzer 200. The connected component determining unit 222, the graph partitioning unit 223, the score estimating unit 225, and the estimation result displaying unit 226 are implemented, for example, using programs executed by a CPU of the analyzer 200. The analyzer 200 corresponds to the information processor 20 of the second embodiment.

The graph storing unit 221 stores graph information representing an entire graph. The graph storing unit 221 corresponds to the graph storing unit 121 of the third embodiment.

The connected component determining unit 222 divides the graph defined by the graph information stored in the graph storing unit 221 into connected subgraphs (connected components). For example, the connected component determining unit 222 selects one score-unknown node from the graph, then determines a set of nodes reachable along edges by depth-first search starting from the selected score-unknown node, and separates the determined set of nodes from the graph as a connected subgraph. The connected component determining unit 222 repeats this until there are no more score-unknown nodes left, to thereby extract one or more connected subgraphs.

The graph partitioning unit 223 divides each connected subgraph extracted by the connected component determining unit 222 into one or more subgraphs for score propagation. For example, the graph partitioning unit 223 selects one score-unknown node from the connected subgraph, then determines a set of nodes reachable along edges by depth-first search starting from the selected score-unknown node, and separates the determined set of nodes from the connected subgraph as a score propagation subgraph. Note here that the graph partitioning unit 223 treats each score-known node as an end vertex and deems that edges beyond the score-known node are impassable. The graph partitioning unit 223 is able to use a similar search algorithm to that used by the connected component determining unit 222; however, the graph partitioning unit 223 differs from the connected component determining unit 222 in regarding score-known nodes as end vertices. That is, the graph partitioning unit 223 has a different definition of "reachable range".

The graph partitioning unit 223 generates an adjacency matrix for each of the partitioned subgraphs used for score propagation, and stores partitioned graph information including the adjacency matrix in the partitioned graph storing unit 224.

The partitioned graph storing unit 224 stores the partitioned graph information of each partitioned subgraph.

The score estimating unit 225 estimates unknown scores using the partitioned graph information stored in the partitioned graph storing unit 224 in place of the graph information stored in the graph storing unit 221. The score estimating unit 225 corresponds to the score estimating unit 124 of the third embodiment. The score estimating unit 225 is able to process a plurality of subgraphs independently of each other. Unknown scores of score-unknown nodes belonging to a subgraph are estimated without referring to partitioned graph information of other subgraphs. The score estimating unit 225 may process a plurality of subgraphs in parallel using a plurality of processors or processor cores.

The score estimating unit 225 outputs estimation results of the unknown scores to the estimation result displaying unit 226.

The estimation result displaying unit 226 causes a display device of the analyzer 200 to display a screen such as a score estimation request screen and a score estimation result screen, to thereby provide the user with a visual interface. The estimation result displaying unit 226 corresponds to the estimation result displaying unit 125 of the third embodiment.

FIG. 14 illustrates exemplary graph information according to the fourth embodiment. Graph information 250 is stored in the graph storing unit 221. The graph information 250 represents the graph 230 of FIG. 11. The graph information 250 includes scores associated with node IDs individually indicating the nodes 231 to 239. A score associated with each score-known node is a numerical value indicating an investment rating of a company represented by the score-known node. A score associated with each score-unknown node is set to a numerical value of −1, which indicates that the score of the node is unknown. The graph information 250 also includes the weights w12, w14, w15, w17, w25, w28, w38, w39, w46, and w78 of ten edges among the nodes 231 to 239.

FIG. 15 illustrates exemplary partitioned graph information according to the fourth embodiment. Partitioned graph information 251, 252, and 253 is stored in the partitioned graph storing unit 224. The partitioned graph information 251, 252, and 253 is transformed from the graph information 250. With respect to each cluster, the graph partitioning unit 223 extracts, from the graph information 250, rows and columns corresponding to nodes belonging to the cluster, to thereby generate partitioned graph information. The partitioned graph information 251 represents the cluster 241 of FIG. 12. The partitioned graph information 252 represents the cluster 242 of FIG. 12. The partitioned graph information 253 represents the cluster 243 of FIG. 12.

Hence, the partitioned graph information 251 includes node IDs and scores of the nodes 233, 238, and 239. In addition, the partitioned graph information 251 includes an adjacency matrix with rows and columns corresponding to the nodes 233, 238, and 239. The adjacency matrix includes the weight w38 between the nodes 233 and 238 and the weight w39 between the nodes 233 and 239.

The partitioned graph information 252 includes node IDs and scores of the nodes 231, 232, 234, 235, 237, and 238. In addition, the partitioned graph information 252 includes an adjacency matrix with rows and columns corresponding to the nodes 231, 232, 234, 235, 237, and 238. The adjacency matrix includes the weight w12 between the nodes 231 and 232, the weight w14 between the nodes 231 and 234, the weight w15 between the nodes 231 and 235, and the weight w17 between the nodes 231 and 237. In addition, the adjacency matrix includes the weight w25 between the nodes 232 and 235, the weight w28 between the nodes 232 and 238, and the weight w78 between the nodes 237 and 238.

The partitioned graph information 253 includes node IDs and scores of the nodes 234 and 236. In addition, the partitioned graph information 253 includes an adjacency matrix with rows and columns corresponding to the nodes 234 and 236. The adjacency matrix includes the weight w46 between the nodes 234 and 236.

Figure 16:
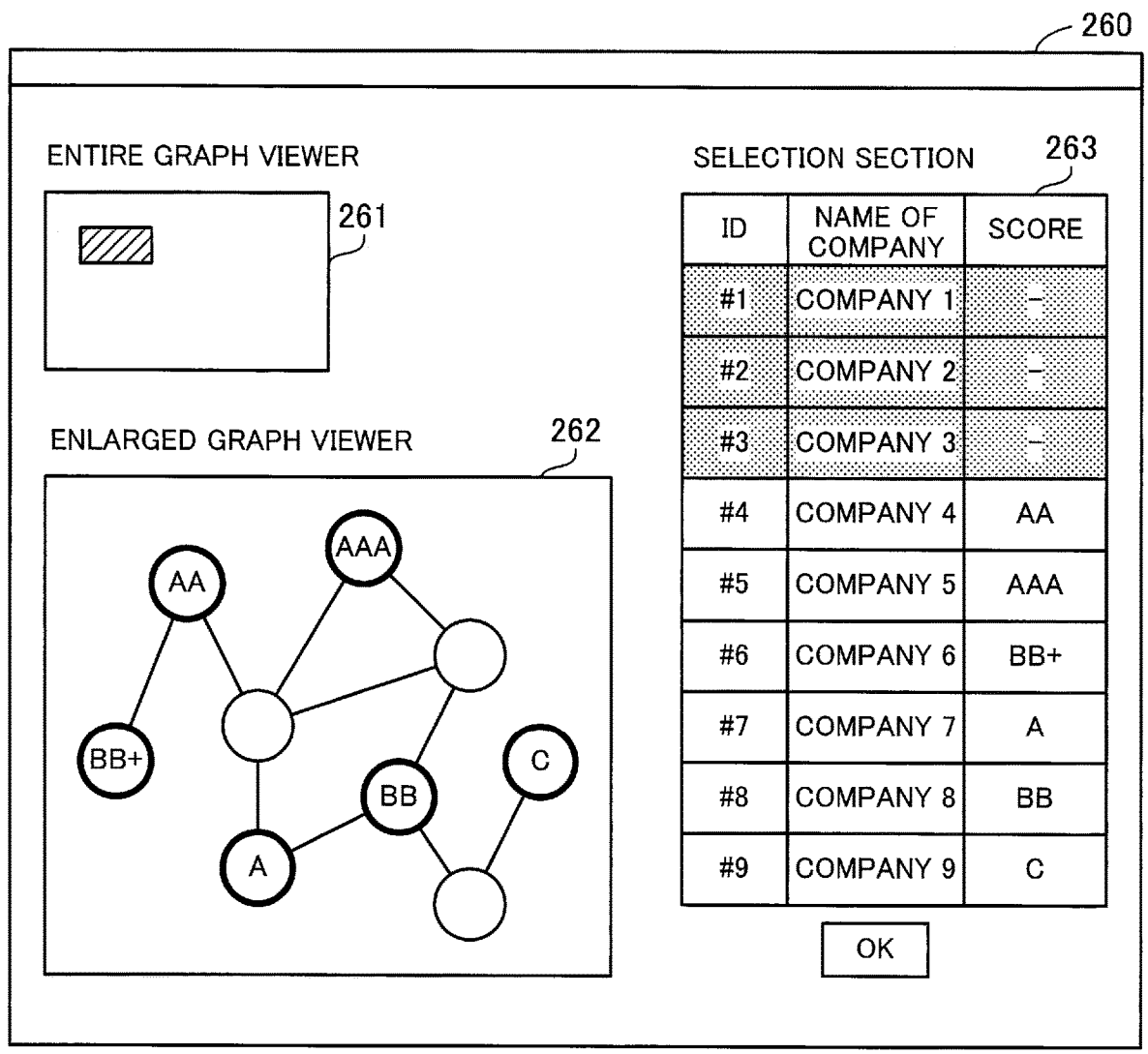
FIG. 16 illustrates an exemplary score estimation request screen according to the fourth embodiment.

FIG. 16 illustrates an exemplary score estimation request screen according to the fourth embodiment. A score estimation request screen 260 is displayed by the estimation result displaying unit 226. The score estimation request screen 260 includes an entire graph viewer 261, an enlarged graph viewer 262, and a selection section 263. Note that the estimation result displaying unit 125 of the third embodiment is also able to display a score estimation request screen similar to the score estimation request screen 260.

The entire graph viewer 261 visually displays nodes and edges of an entire graph. The enlarged graph viewer 262 visually displays some nodes and edges included in the graph. If the graph is huge in size, the nodes and edges are displayed small in the entire graph viewer 261. Therefore, the user is able to select a region in the entire graph viewer 261 to thereby display, in the enlarged graph viewer 262, a magnified view of nodes and edges included in the selected region. Score-known nodes amongst the nodes displayed in the enlarged graph viewer 262 are given alphabets, such as AAA and BB, to indicate investment ratings.

The selection section 263 is a table including columns named ID, NAME OF COMPANY, and SCORE. The selection section 263 lists information of companies represented by the nodes displayed in the enlarged graph viewer 262. That is, node IDs of the nodes displayed in the enlarged graph viewer 262 and names of the companies represented by the nodes are displayed in the selection section 263. In addition, as for score-known nodes, known scores of the score-known nodes are displayed. As for score-unknown nodes, no entries are made under SCORE in the selection section 263. The user is able to select, from the selection section 263, one or more score-unknown nodes whose unknown scores are to be estimated.

Figure 17:
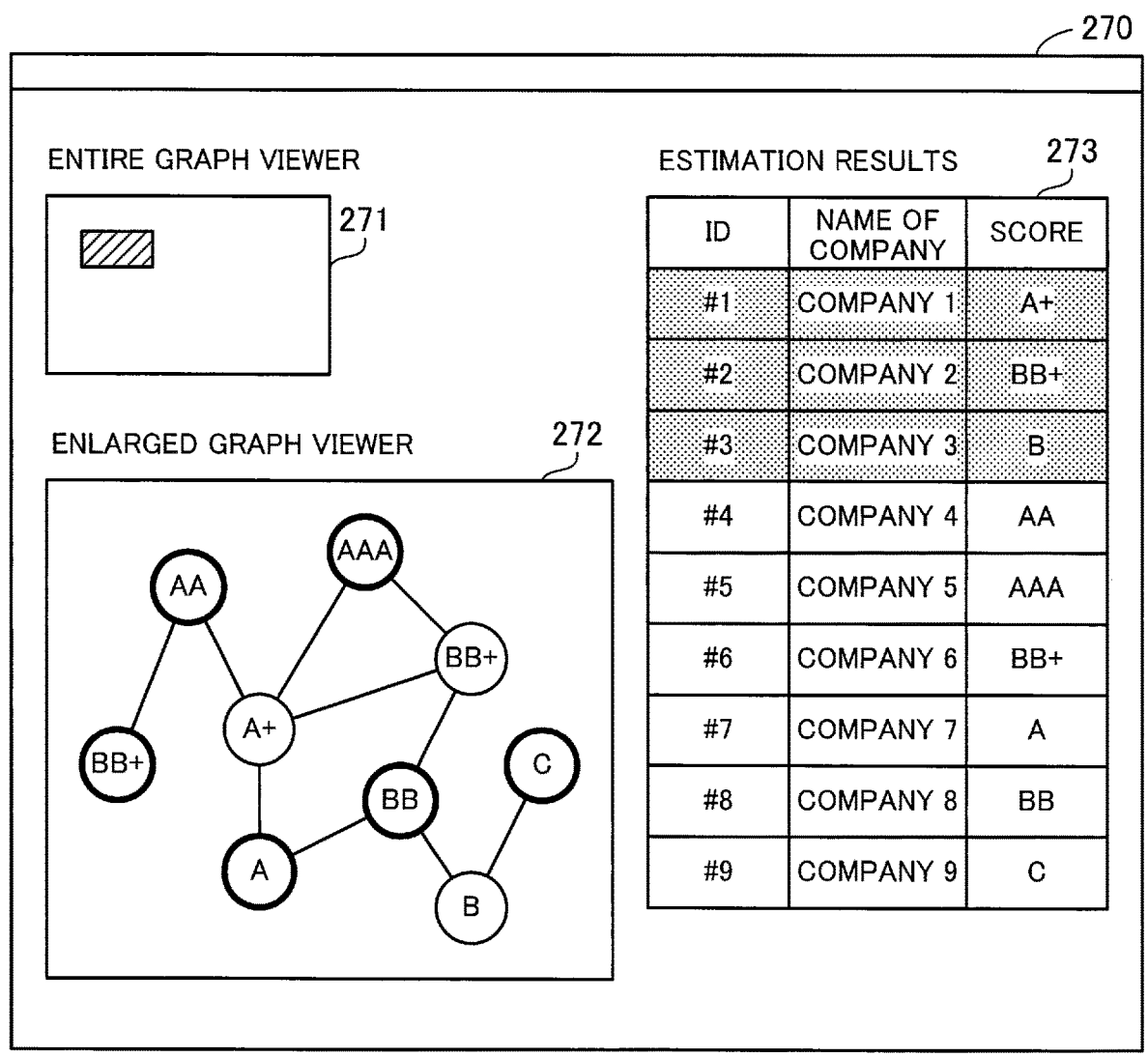
FIG. 17 illustrates an exemplary score estimation result screen according to the fourth embodiment.

FIG. 17 illustrates an exemplary score estimation result screen according to the fourth embodiment. A score estimation result screen 270 is displayed by the estimation result displaying unit 226. The score estimation result screen 270 includes an entire graph viewer 271, an enlarged graph viewer 272, and estimation results 273. Note that the estimation result displaying unit 125 of the third embodiment is able to display a score estimation result screen similar to the score estimation result screen 270.

The entire graph viewer 271 is the same as the entire graph viewer 261 of the score estimation request screen 260. The enlarged graph viewer 272 is the same as the enlarged graph viewer 262 of the score estimation request screen 260. Note however that score-unknown nodes displayed in the enlarged graph viewer 272 are given alphabets, such as A+ and BB+, to indicate estimated investment ratings. The estimation results 273 are the same as the selection section 263 of the score estimation request screen 260. Note however that, in the estimation results 273, the alphabets indicating investment ratings estimated for the score-unknown nodes are listed under SCORE.

Figure 18:
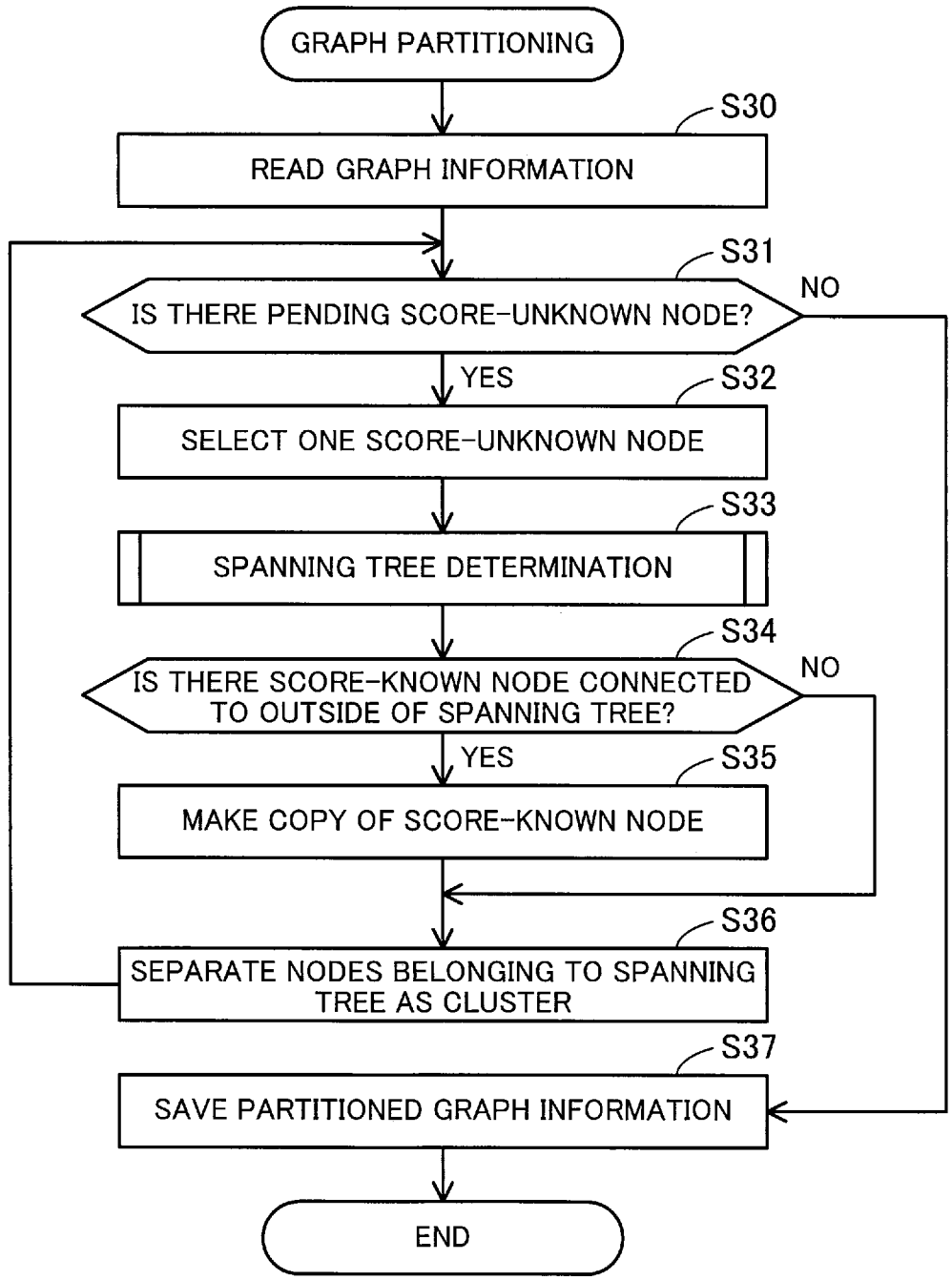
FIG. 18 is a flowchart illustrating an exemplary procedure for graph partitioning according to the fourth embodiment.

Next described is a processing procedure of the analyzer 200. FIG. 18 is a flowchart illustrating an exemplary procedure for graph partitioning according to the fourth embodiment.

(Step S30) The connected component determining unit 222 reads graph information from the graph storing unit 221. The connected component determining unit 222 extracts connected subgraphs from a graph defined by the graph information. To extract the connected subgraphs, a search algorithm may be used, which is similar to one used to determine spanning trees in step S33 to be described below. Note however that the connected subgraph extraction differs from the spanning tree determination in step S33 in not treating score-known nodes as end vertices. Then, each of the extracted connected subgraphs undergoes the following steps S31 to S36.

(Step S31) The graph partitioning unit 223 determines whether a pending score-unknown node is left in the connected subgraph. If any pending score-unknown node remains, the process moves to step S32. If not, the process moves to step S37.

(Step S32) The graph partitioning unit 223 selects a score-unknown node from the connected subgraph.

(Step S33) The graph partitioning unit 223 performs spanning tree determination using the score-unknown node selected in step S32 as a start vertex. Herewith, a spanning tree including some or all of nodes remaining in the connected subgraph is determined. The spanning tree determination is described later in detail.

(Step S34) The graph partitioning unit 223 determines whether the spanning tree determined in step S33 includes one or more score-known nodes each connected to a node external to the spanning tree. If the spanning tree includes a score-known node connected to an external node, the process moves to step S35. If not, the process moves to step S36.

(Step S35) As for, amongst nodes belonging to the spanning tree, one or more score-known nodes each connected to a node external to the spanning tree, the graph partitioning unit 223 makes a copy of each score-known node and then leaves the copy in the connected subgraph.

(Step S36) The graph partitioning unit 223 separates the nodes belonging to the spanning tree determined in step S33 from the connected subgraph to create a cluster. The process then returns to step S31.

(Step S37) The graph partitioning unit 223 generates partitioned graph information for each cluster from the graph information read in step S30. Specifically, the graph partitioning unit 223 extracts, from the adjacency matrix of the graph information, rows and columns corresponding to nodes belonging to each cluster, and generates an adjacency matrix of the cluster based on the extracted rows and columns. The graph partitioning unit 223 saves the generated partitioned graph information in the partitioned graph storing unit 224.

Figure 19:
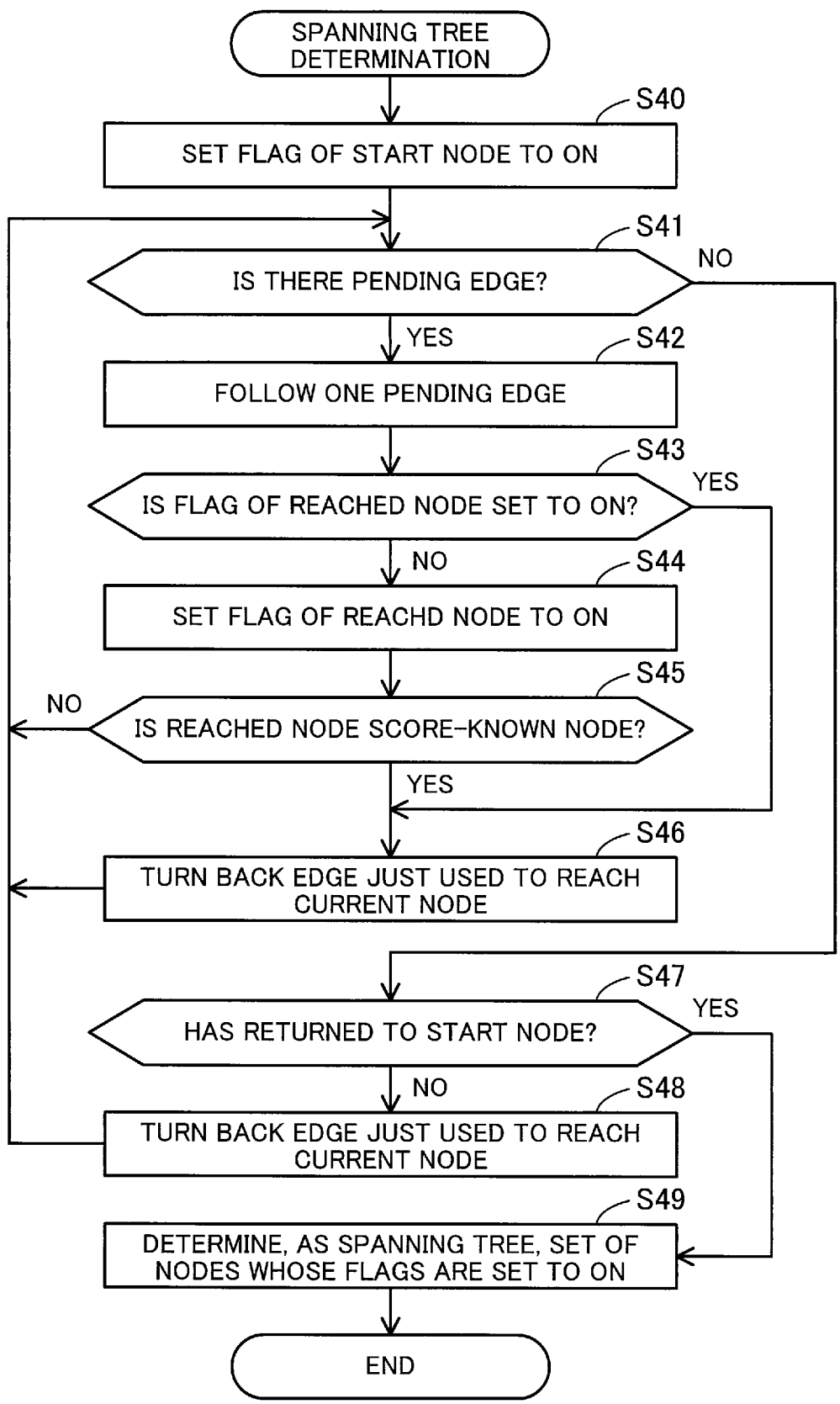
FIG. 19 is a flowchart illustrating an exemplary procedure for spanning tree determination according to the fourth embodiment.

FIG. 19 is a flowchart illustrating an exemplary procedure for the spanning tree determination according to the fourth embodiment. The spanning tree determination is carried out in step S33 above.

(Step S40) The graph partitioning unit 223 sets the selected score-unknown node as a start node and sets the flag of the score-unknown node to ON.

(Step S41) The graph partitioning unit 223 determines whether one or more pending edges are left amongst edges connected to the currently examined node. If any pending edge remains, the process moves to step S42. If not, the process moves to step S47.

(Step S42) The graph partitioning unit 223 follows one pending edge.

(Step S43) The graph partitioning unit 223 determines whether the flag of a node reached through the edge is already set to ON. If the flag is set to ON, the process moves to step S46. If not (i.e., the flag is set to OFF, the process moves to step S44.

(Step S44) The graph partitioning unit 223 sets the flag of the reached node to ON.

(Step S45) The graph partitioning unit 223 determines whether the reached node is a score-known node. If the reached node is a score-known node, the process moves to step S46. If it is a score-unknown node, the process moves to step S41.

(Step S46) The graph partitioning unit 223 turns back the edge used to reach the node instead of searching an edge beyond the reached node. The process then returns to step S41.

(Step S47) The graph partitioning unit 223 determines whether it has returned to the start node. If the graph partitioning unit 223 has returned to the start node, the process moves to step S49. If not, the process moves to step S48.

(Step S48) The graph partitioning unit 223 turns back an edge used to reach the currently examined node. Then, the process moves to step S41.

(Step S49) The graph partitioning unit 223 determines, amongst nodes included in the connected subgraph, a set of nodes whose flags are set to ON as a spanning tree.

Note that an algorithm used to extract the connected subgraphs in step S30 above is implemented by causing the process to proceed to step S41 straight after step S44 while skipping step S45 (i.e., without making the determination in step S45). In addition, the score estimating unit 225 runs a score estimation algorithm similar to that of the third embodiment on the partitioned graph information of each partitioned subgraph to thereby estimate unknown scores.

According to the analyzer 200 of the fourth embodiment, a graph is divided into connected subgraphs, each of which is then further partitioned into smaller subgraphs by regarding score-known nodes as end vertices. Then, unknown score estimation is performed for each of the partitioned subgraphs. This reduces the number of rows and columns of each adjacency matrix used, which provides savings in computational effort for score propagation. As a result, it is possible to increase the speed of a corporate network analysis task for estimating, from investment ratings of some companies, those of other companies. In addition, partitioning of each connected subgraph in the above-described manner produces no change in score-known nodes reachable from each score-unknown node in an absorbing Markov chain, thus causing no change in the estimation results of unknown scores. Hence, analytical accuracy is maintained.

Note that the computational effort reduction techniques according to the third and fourth embodiments may be used in combination. For example, score-known nodes are aggregated by the method of the third embodiment, and the graph is then partitioned according to the method of the fourth embodiment. Alternatively, the graph is partitioned by the method of the fourth embodiment, and score-known nodes are then aggregated for each subgraph according to the method of the third embodiment. Note that the third and fourth embodiments use "scores", which are measured on an interval or ratio scale, as node information assigned to nodes. Alternatively, "labels" which are measured on a nominal or ordinal scale may be used as the node information. Unknown labels are estimated by label propagation similar to the score propagation described above.

According to one aspect, it is possible to provide savings in computational effort for estimating node information in a graph analysis task.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A computer-implemented node information estimation method comprising:
    acquiring graph information representing a graph that includes a plurality of nodes and a plurality of inter-node edges between the plurality of nodes, the plurality of nodes including a first plurality of nodes each associated with node information and a first node different from the first plurality of nodes, each of the plurality of inter-node edges being associated with a weight;
    extracting two or more nodes associated with common node information from the first plurality of nodes and transforming the two or more nodes into an aggregate node associated with the common node information;
    generating an aggregate inter-node edge between the aggregate node and the first node, the aggregate inter-node edge being associated with a weight based on two or more weights associated with two or more inter-node edges between the two or more nodes and the first node; and
    estimating first node information to be associated with the first node based on transformed graph information representing a transformed graph including the aggregate node and the aggregate inter-node edge,
    wherein the estimating includes:
    generating a vector and an adjacency matrix from the transformed graph information, the vector including a constant indicating the common node information and a variable indicating the first node information, the adjacency matrix including the weight of the aggregate inter-node edge, and
    searching for an optimized value of the variable that minimizes an evaluation value calculated from the vector and the adjacency matrix, wherein:
    the estimating includes propagating the common node information from the aggregate node to the first node by using the weight of the aggregate inter-node edge.

2. The computer-implemented node information estimation method according to claim 1, wherein:
    the first node information is estimated based on the common node information of the aggregate node and the weight associated with the aggregate inter-node edge.

3. The computer-implemented node information estimation method according to claim 1, wherein:
    the weight associated with the aggregate inter-node edge is a sum of the two or more weights.

4. A non-transitory computer-readable recording medium storing therein instructions executable by one or more computers, the instructions comprising:
    one or more instructions for acquiring graph information representing a graph that includes a plurality of nodes and a plurality of inter-node edges between the plurality of nodes, the plurality of nodes including a first plurality of nodes each associated with node information and a first node different from the first plurality of nodes, each of the plurality of inter-node edges being associated with a weight;
    one or more instructions for extracting two or more nodes associated with common node information from the first plurality of nodes and transforming the two or more nodes into an aggregate node associated with the common node information;
    one or more instructions for generating an aggregate inter-node edge between the aggregate node and the first node, the aggregate inter-node edge being associated with a weight based on two or more weights associated with two or more inter-node edges between the two or more nodes and the first node; and
    one or more instructions for estimating first node information to be associated with the first node based on transformed graph information representing a transformed graph including the aggregate node and the aggregate inter-node edge, wherein the estimating includes:
    generating a vector and an adjacency matrix from the transformed graph information, the vector including a constant indicating the common node information and a variable indicating the first node information, the adjacency matrix including the weight of the aggregate inter-node edge, and
    searching for an optimized value of the variable that minimizes an evaluation value calculated from the vector and the adjacency matrix, wherein:
    the estimating includes propagating the common node information from the aggregate node to the first node by using the weight of the aggregate inter-node edge.

5. The non-transitory computer-readable recording medium according to claim 4, wherein:
    the first node information is estimated based on the common node information of the aggregate node and the weight associated with the aggregate inter-node edge.

6. The non-transitory computer-readable recording medium according to claim 4, wherein:
    the weight associated with the aggregate inter-node edge is a sum of the two or more weights.

7. An information processing apparatus comprising:
    a memory configured to store graph information representing a graph that includes a plurality of nodes and a plurality of inter-node edges between the plurality of nodes, the plurality of nodes including a first plurality of nodes each associated with node information and a first node different from the first plurality of nodes, each of the plurality of inter-node edges being associated with a weight; and
    a processor coupled to the memory and configured to:
    determine, based on the graph information, one or more reachable nodes amongst the first plurality of nodes, reachable from the first node via one or more inter-node edges amongst the plurality of inter-node edges without going through another node, and extract, from the graph, a subgraph including the first node and having a boundary around the one or more reachable nodes, and
    calculating, based on subgraph information representing the subgraph, first node information to be associated with the first node from the node information associated with the one or more reachable nodes and one or more weights associated with the one or more inter-node edges,
    wherein the calculating includes:
    generating a vector and an adjacency matrix from the subgraph information, the vector including one or more constants indicating the node information of the one or more reachable nodes and a variable indicating the first node information, the adjacency matrix including the one or more weights, and
    searching for an optimized value of the variable that minimizes an evaluation value calculated from the vector and the adjacency matrix, wherein:

the calculating includes propagating the node information of the one or more reachable nodes to the first node through the one or more inter-node edges by using the one or more weights.

* * * * *